(12) United States Patent
Zhamu et al.

(10) Patent No.: US 11,217,792 B2
(45) Date of Patent: Jan. 4, 2022

(54) GRAPHENE-ENABLED METAL FLUORIDE AND METAL CHLORIDE CATHODE ACTIVE MATERIALS FOR LITHIUM BATTERIES

(71) Applicant: Nanotek Instruments, Inc., Dayton, OH (US)

(72) Inventors: Aruna Zhamu, Springboro, OH (US); Bor Z Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 153 days.

(21) Appl. No.: 15/412,852

(22) Filed: Jan. 23, 2017

(65) Prior Publication Data
US 2018/0212247 A1      Jul. 26, 2018

(51) Int. Cl.

| | |
|---|---|
| H01M 4/62 | (2006.01) |
| H01M 4/136 | (2010.01) |
| H01M 4/04 | (2006.01) |
| H01M 4/1397 | (2010.01) |
| H01M 4/36 | (2006.01) |
| H01M 4/58 | (2010.01) |
| H01M 4/02 | (2006.01) |

(52) U.S. Cl.
CPC ......... *H01M 4/625* (2013.01); *H01M 4/0419* (2013.01); *H01M 4/0497* (2013.01); *H01M 4/136* (2013.01); *H01M 4/1397* (2013.01); *H01M 4/362* (2013.01); *H01M 4/582* (2013.01); *H01M 2004/028* (2013.01)

(58) Field of Classification Search
None
See application file for complete search history.

(56) References Cited

U.S. PATENT DOCUMENTS

| | | |
|---|---|---|
| 2,798,878 A | 7/1957 | Hummers |
| 7,071,258 B1 | 7/2006 | Jang et al. |
| 9,666,899 B2 | 5/2017 | He et al. |
| 2005/0271574 A1 | 12/2005 | Jang et al. |
| 2007/0092716 A1 | 4/2007 | Guo et al. |
| 2008/0048152 A1 | 2/2008 | Jang et al. |
| 2010/0206363 A1 | 8/2010 | Choi |
| 2011/0017585 A1 | 1/2011 | Zhamu et al. |

(Continued)

OTHER PUBLICATIONS

F. Badway, et al., "Carbon metal fluoride nanocomposites high-capacity reversible metal fluoride conversion materials as rechargeable positive electrodes for Li batteries," J. Electrochem. Soc. 150 (2003) A1318-A1327.

(Continued)

*Primary Examiner* — Tracy M Dove

(57) ABSTRACT

A graphene-enhanced transition metal fluoride or chloride hybrid particulate for use as a lithium battery cathode active material, wherein the particulate is formed of a single or a plurality of graphene sheets and a plurality of fine transition metal fluoride or chloride particles with a size smaller than 10 μm (preferably sub-micron or nano-scaled), and the graphene sheets and the particles are mutually bonded or agglomerated into an individual discrete particulate with at least a graphene sheet embracing the transition metal fluoride or chloride particles, and wherein the particulate has an electrical conductivity no less than $10^{-4}$ S/cm and the graphene is in an amount of from 0.01% to 30% by weight based on the total weight of graphene and the transition metal fluoride or chloride combined.

26 Claims, 12 Drawing Sheets

(56) References Cited

U.S. PATENT DOCUMENTS

2013/0271085 A1 10/2013 Chen et al.
2016/0043384 A1 2/2016 Zhamu et al.

OTHER PUBLICATIONS

S.W. Kim, et al., "Fabrication of FeF3 nanoflowers on CNT branches and their application to high power lithium rechargeable batteries," Adv. Mater. 22 (2010) 5260-5264.
L. Liu, et al., "Synthesis and electrochemical performance of spherical FeF3/ACMB composite as cathode material for lithium-ion batteries," J. Mater. Sci. 47 (2012) 1819-1824.
J. Liu, et al., "Mild and cost-effective synthesis of iron fluoride-graphene nanocomposites for high-rate Li-ion battery cathodes," J. Mater. Chem. A 1 (2013) 1969-1975.
X. Zhao, et al., "Photothermal-assisted fabrication of iron fluoride-graphene composite paper cathodes for high-energy lithium-ion batteries," Chem. Commun. 48 (2012) 9909-9911.
Q. Chu, et al. "Reduced graphene oxide decorated with FeF3 nanoparticles: Facile synthesis and application as a high capacity cathode material for rechargeable lithium batteries," Electrochim. Acta. 111 (2013) 80.
F. Karlicky, et al. "Halogenated Graphenes: Rapidly Growing Family of Graphene Derivatives" ACS Nano, 2013, 7 (8), pp. 6434-6464.
Kim et al., "A cathode material for lithium-ion batteries based on graphitized carbon-wrapped FeF3 nanoparticles prepared by facile polymerization" Journal of Materials Chemistry A (2016) vol. 4, pp. 14857-14864.
Li et al., "High-Capacity Lithium-Ion Battery Conversion Cathodes Based on Iron Fluoride Nanowires and Insights into the Conversion Mechanism" Nano Letters (2012) vol. 12, pp. 6030-6037.
Liu et al., "Excellent cycle performance of Co-doped FeF3/C nanocomposite cathode material for lithium-ion batteries" Journal of Materials Chemistry (2012) vol. 22, pp. 17539-17550.
Liu et al., "Mild and cost-effective synthesis of iron fluoride-graphene nanocomposites for high-rate Li-ion battery cathodes" Journal of Materials Chemistry A (2012) vol. 1, pp. 1969-1975.
Ma et al., "Large-scale fabrication of graphene-wrapped FeF3 nanocrystals as cathode materials for lithium ion batteries" Nanoscale (2013) vol. 5, pp. 6338-6343.
Zhou et al., "Facile Spray Drying Route for the Three-Dimensional Graphene-Encapsulated Fe2O3 Nanoparticles for Lithium Ion Battery Anodes" Industrial & Engineering Chemistry Research (2012) vol. 52, pp. 1197-1204.
PCT/US18/13756 International Search Report and Written Opinion, dated Apr. 5, 2018, 13 pages.
Chen et al., "Three-dimensional Flexible and Conductive Interconnected Graphene Networks Grown by Chemical Vapor Deposition" Nature Materials (2011) vol. 10, pp. 424-428.
Choi et al., "3D Macroporous Graphene Frameworks for Supercapacitors with High Energy and Power Densities" ACS Nano (2012) vol. 6, pp. 4020-4028.
Conte et al., "A review on the application of iron(III) fluorides as positive electrodes for secondary cells" Matter Renew Sustain Energy (2014) 3:37.
Luo et al., "Three-Dimensional Graphene Foam Supported Fe3O4 Lithium Battery Anodes with Long Cycle Life and High Rate Capability, ACS Publications" Nano Letters (2013) vol. 13, pp. 6136-6143.
PCT/US18/13759 International Search Report and Written Opinion dated Mar. 29, 2018, 10 pages.
Xu et al., "Self-Assembled Graphene Hydrogel via a One-Step Hydrothermal Process" ACS Nano (2010) vol. 4, No. 7, pp. 4324-4330.
U.S. Appl. No. 15/416,850 Nonfinal Office Action dated May 24, 2019, 17 pages.
U.S. Appl. No. 15/419,454 Nonfinal Office Action dated May 31, 2019, 11 pages.

5 μm

GRAPHENE-ENABLED METAL FLUORIDE AND METAL CHLORIDE CATHODE ACTIVE MATERIALS FOR LITHIUM BATTERIES

FIELD OF THE INVENTION

The present invention relates generally to the field of lithium metal or lithium-ion batteries and, in particular, to graphene-enabled or graphene-enhanced cathode active materials containing transition metal fluoride or metal chloride for a lithium metal battery or lithium-ion battery.

BACKGROUND OF THE INVENTION

Historically, today's most favorite rechargeable energy storage devices—lithium-ion batteries—actually evolved from rechargeable "lithium metal batteries" using lithium (Li) metal as the anode and a Li intercalation compound (e.g. $MoS_2$) as the cathode. Li metal is an ideal anode material due to its light weight (the lightest metal), high electronegativity (−3.04 V vs. the standard hydrogen electrode), and high theoretical capacity (3,860 mAh/g). Based on these outstanding properties, lithium metal batteries were proposed 40 years ago as an ideal system for high energy-density applications.

Due to some safety concerns of pure lithium metal, graphite was implemented as an anode active material in place of the lithium metal to produce the current lithium-ion batteries. The past two decades have witnessed a continuous improvement in Li-ion batteries in terms of energy density, rate capability, and safety. However, the use of graphite-based anodes in Li-ion batteries has several significant drawbacks: low specific capacity (theoretical capacity of 372 mAh/g as opposed to 3,860 mAh/g for Li metal), long Li intercalation time (e.g. low solid-state diffusion coefficients of Li in and out of graphite and inorganic oxide particles) requiring long recharge times (e.g. 7 hours for electric vehicle batteries), inability to deliver high pulse power (power density <<1 kW/kg), and necessity to use pre-lithiated cathodes (e.g. lithium cobalt oxide, as opposed to cobalt oxide), thereby limiting the choice of available cathode materials. Further, these commonly used cathode active materials have a relatively low specific capacity (typically <220 mAh/g). These factors have contributed to the two major shortcomings of today's Li-ion batteries—a low energy density (typically 150-220 Wh/$kg_{cell}$) and low power density (typically <0.5 kW/kg).

Although several high-capacity anode active materials have been found (e.g., Si with a theoretical capacity of 4,200 mAh/g), there has been no corresponding high-capacity cathode material available. To sum it up, battery scientists have been frustrated with the low energy density of lithium-ion cells for over three decades! Current cathode active materials commonly used in Li-ion batteries have the following serious drawbacks:

(1) The practical capacity achievable with current cathode materials (e.g. lithium iron phosphate and lithium transition metal oxides) has been limited to the range of 150-250 mAh/g and, in most cases, less than 200 mAh/g.
(2) The production of these cathode active materials normally has to go through a high-temperature sintering procedure for a long duration of time, a tedious, energy-intensive, and difficult-to-control process.
(3) The insertion and extraction of lithium in and out of these commonly used cathodes rely upon extremely slow solid-state diffusion of Li in solid particles having very low diffusion coefficients (typically $10^{-8}$ to $10^{-14}$ $cm^2$/s), leading to a very low power density (another long-standing problem of today's lithium-ion batteries).
(4) Current cathode active materials are electrically and thermally insulating, not capable of effectively and efficiently transporting electrons and heat. The low electrical conductivity means high internal resistance and the necessity to add a large amount of conductive additives, effectively reducing the proportion of electrochemically active material in the cathode that already has a low capacity. The low thermal conductivity also implies a higher tendency to undergo thermal runaway, a major safety issue in lithium battery industry.
(5) The most commonly used cathodes, including lithium transition metal oxides, contain a high oxygen content that could assist in accelerating the thermal runaway and provide oxygen for electrolyte oxidation, increasing the danger of explosion or fire hazard. This is a serious problem that has hampered the widespread implementation of electric vehicles.

Thus, there is a strong and urgent need to develop high-capacity cathode active materials. Metal fluorides with metallic cations in high oxidation states and a strong ionic character of the M-F bonds (M=a metal) have been proposed as alternative cathode active materials due to their high theoretical energy densities. For instance, $FeF_3$ has attracted considerable interests because of its low cost and low toxicity. However, the highly ionic character induces a large band gap, thus metal fluorides have very poor electronic conductivity. In addition, LiF, the product of the conversion reaction, is also highly insulating. Accordingly, metal fluoride electrodes often suffer severely from slow reaction kinetics and low lithium storage capacity, significantly lower than the theoretical capacity.

Several attempts have been made to overcome these issues, but with very limited success. For instance, an effort was made to enhance the electrochemical activity by reducing the metal fluoride particle size to the nanometer range for the purpose of achieving shorter electron-conducting paths and larger reaction surface. In this example, Badway, et al. reported a $FeF_3$/C nanocomposite through ball-milling [F. Badway, et al., "Carbon metal fluoride nanocomposites high-capacity reversible metal fluoride conversion materials as rechargeable positive electrodes for Li batteries," J. Electrochem. Soc. 150 (2003) A1318-A1327]. However, this method has several drawbacks, including difficulties in controlling materials properties and production of a significant number of defects.

The deposition of $FeF_3$ on conductive carbon particle surfaces without ball milling was proposed as another means of improving electrode performance. For instance, Kim et al. have fabricated carbon nanotube/$FeF_3$ composites by nucleation of $FeF_3$ on the defects of CNT surfaces generated by HF etching [S. W. Kim, et al., "Fabrication of $FeF_3$ nanoflowers on CNT branches and their application to high power lithium rechargeable batteries," Adv. Mater. 22 (2010) 5260-5264]. This strategy has been followed by others to fabricate $FeF_3$ on activated carbon micro bead [L. Liu, et al., "Synthesis and electrochemical performance of spherical $FeF_3$/ACMB composite as cathode material for lithium-ion batteries," J. Mater. Sci. 47 (2012) 1819-1824]. Liu et al. proposed a low-temperature in situ approach for the synthesis of uniform $FeF_3$ nano particles on reduced graphene oxide (rGO) sheets suspended in ethanol solution [J. Liu, et al., "Mild and cost-effective synthesis of iron fluoride-graphene nanocomposites for high-rate Li-ion battery cathodes," J. Mater. Chem. A 1 (2013) 1969-1975]. However, the loading level of $FeF_3$ on rGO and the rate capability of the $FeF_3$/graphene composites remain too low for practical applications.

Other attempts to use graphene as a conductive additive for $FeF_3$ all fall short in providing good rate capability, high energy density, and long cycle life. Examples of these earlier efforts are [X. Zhao, et al., "Photothermal-assisted fabrication of iron fluoride-graphene composite paper cathodes for high-energy lithium-ion batteries," Chem. Commun. 48 (2012) 9909-9911] and [Q. Chu, et al. "Reduced graphene oxide decorated with $FeF_3$ nanoparticles: Facile synthesis and application as a high capacity cathode material for rechargeable lithium batteries," Electrochim. Acta. 111 (2013) 80]. Although Q. Chu, et al. claim to achieve a high specific capacity of 476 mAh/g, this capacity is achieved only when the current density is at a practically useless value of 50 mA/g (an excessively low discharge rate). Further, the specific capacity rapidly drops to approximately 110 mAh/g after only 50 charge-discharge cycles (see FIG. 5B of Chu, et al.). Furthermore, this maximum achievable value of 476 mAh/g is significantly lower than the theoretical specific capacity of 712 mAh/g for $FeF_3$, indicating a low active material utilization rate (i.e. a significant proportion of the active material is not fully utilized).

Due to extremely poor electrical conductivity of all cathode active materials in a lithium-ion or lithium metal cell, a conductive additive (e.g. carbon black, fine graphite particles, expanded graphite particles, or their combinations), typically in the amount of 2%-15%, must be added into the electrode. However, the conductive additive is not an electrode active material. The use of a non-active material means that the relative proportion of an electrode active material is reduced or diluted. For instance, the incorporation of 5% by weight of PVDF as a binder and 5% of carbon black as a conductive additive in a cathode would mean that the maximum amount of the cathode active material (e.g., lithium cobalt oxide) is only 90%, effectively reducing the total lithium ion storage capacity. Since the specific capacities of the more commonly used cathode active materials are already very low (140-220 mAh/g), this problem is further aggravated if a significant amount of non-active materials is used to dilute the concentration of the active material.

Carbon black (CB) materials, as a conductive additive, have several drawbacks: (1) CBs are typically available in the form of aggregates of multiple primary particles that are typically spherical in shape. Due to this geometric feature (largest dimension-to-smallest dimension ratio or aspect ratio ~1) and the notion that CBs are a minority phase dispersed as discrete particles in an electrically insulating matrix (e.g. lithium cobalt oxide and lithium iron phosphate), a large amount of CBs is required to reach a percolation threshold where the CB particles are combined to form a 3-D network of electron-conducting paths. (2) CBs themselves have a relatively low electrical conductivity and, hence, the resulting electrode remains to be of relatively low conductivity even when the percolation threshold is reached. A relatively high proportion of CBs (far beyond the percolation threshold) must be incorporated in the cathode to make the resulting composite electrode reasonably conducting.

Clearly, an urgent need exists for an effective supporting material for metal fluorides that enables a high cathode active material utilization rate, high specific capacity at both high and low charge/discharge rates (not just at a low rate), high rate capability, long cycle-life, and improved heat dissipation generated during a battery operation. These are the main objectives of the instant invention.

This supporting or "enabling" material also must be electrically conductive. Preferably, this electrically conductive supporting material is also of high thermal conductivity. Such a thermally conductive additive would be capable of dissipating the heat generated from the electrochemical operation of the Li-ion battery, thereby increasing the reliability of the battery and decreasing the likelihood that the battery will suffer from thermal runaway and rupture. With a high electrical conductivity, there would be no need to add a high proportion of conductive additives.

Thus, it is another object of the present invention to provide a thermally and electrically conductive "enabling" material that can be easily incorporated in a cathode of a lithium battery. A specific object of the present invention is to provide a conductive supporting material that is capable of helping multiple primary particles of a cathode active material (e.g. a metal fluoride or metal chloride) to aggregate and pack into secondary particles (herein referred to as hybrid particulates) that are more amenable to mass production of cathode electrodes using current production equipment.

A particularly desirable specific object of the present invention is to provide a conductive additive or modifier that is capable of helping multiple primary particles of a cathode active material aggregate into secondary particles that are more conducive to the formation of a 3-D network of electron-conducting paths, imparting exceptional conductivity to the cathode and enabling the cathode to become high-rate capable.

SUMMARY OF THE INVENTION

This invention provides a graphene-enhanced or graphene-enabled hybrid particulate for use as a lithium battery cathode active material. The particulate is formed of a single or a plurality of graphene sheets and a plurality of fine cathode active material particles (primary particles) with a size smaller than 10 μm (preferably smaller than 1 μm, further preferably <100 nm, and most preferably <10 nm). These primary particles include a material selected from a transition metal fluoride or chloride. The graphene sheets and the primary particles are mutually bonded or agglomerated into the hybrid particulate (also referred to as a secondary particle) with at least a graphene sheet embracing the cathode active material particles. The particulates have an electrical conductivity no less than $10^{-4}$ S/cm (typically and preferably greater than $10^{-2}$ S/cm). The graphene component is in an amount of from 0.01% to 30% by weight (preferably between 0.1% to 20% by weight and more preferably between 0.5% and 10%) based on the total weight of graphene and the cathode active material combined. Preferably, the particulate is approximately spherical in shape.

The invented graphene-enabled hybrid particulate for use as a lithium battery cathode active material is formed of a single or a plurality of graphene sheets and a single or a plurality of fine cathode active material particles, selected from a transition metal fluoride or chloride and having a size smaller than 10 μm; wherein the graphene sheets and the particles are mutually bonded or agglomerated into the hybrid particulate containing an exterior graphene sheet or multiple exterior graphene sheets embracing the cathode active material particles, and wherein the hybrid particulate has an electrical conductivity no less than $10^{-4}$ S/cm and the graphene is in an amount of from 0.01% to 30% by weight based on the total weight of graphene and the cathode active material combined. Preferably, the hybrid particulate further contains interior graphene sheets in physical contact with the fine cathode active material particles and the exterior graphene sheet(s).

Preferably, the transition metal fluoride or chloride is selected from the group consisting of $CoF_3$, $MnF_3$, $FeF_3$, $VF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof.

The graphene sheets used in the hybrid particulate preferably comprise single-layer graphene or few-layer graphene, wherein the few-layer graphene is defined as a graphene platelet formed of less than 10 graphene planes. The graphene sheets are selected from pristine graphene, graphene oxide (GO), reduced graphene oxide (RGO), graphene fluoride, graphene chloride, nitrogenated graphene, hydrogenated graphene, doped graphene, or functionalized graphene The cathode active material particles (primary particles) in the hybrid particulate (secondary particle) preferably have a dimension smaller than 1 μm, further preferably smaller than 100 nm, and most preferably smaller than 10 nm (e.g. from 1 nm to 10 nm). Smaller dimensions promote shorter lithium diffusion times and faster battery charge and discharge rates.

This class of cathode active materials is relatively safe and is a preferred class of cathode active materials in the lithium ion batteries for electric vehicle applications.

Optionally, the hybrid particulate further comprises a carbon material in electronic contact with the cathode active material and a graphene sheet. This carbon material can be a polymeric carbon, amorphous carbon, chemical vapor deposition (CVD) carbon, carbon black (CB), acetylene black (AB), activated carbon, fine expanded graphite particle with a dimension smaller than 100 nm, artificial graphite particle, and/or natural graphite particle. Preferably, the carbon material is coated on at least one of the cathode active material particles and more preferably on the surface of all primary particles, which are then embraced by a graphene sheet or a plurality of graphene sheets.

Preferably, the cathode active material particles in the hybrid particulate contain transition metal fluoride or chloride particles in a nanowire, nano-tube, nano-disc, nano-ribbon, nano-belt, or nano platelet form have a diameter or thickness smaller than 100 nm (preferably from 1 nm to 10 nm).

In certain embodiments, the invention provides a graphene-enabled hybrid material for use as a lithium battery cathode active material. The hybrid material contains one or a plurality of graphene sheets and a single or a plurality of fine cathode active material particles that are bonded to a surface of the graphene sheets; wherein the cathode active material particles have a size smaller than 10 μm (preferably <1 μm, more preferably <100 nm, and most preferably <10 nm) and contain a transition metal fluoride or chloride selected from $CoF_3$, $MnF_3$, $VF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, a combination thereof, or a combination thereof with $FeF_3$, and the graphene is in an amount of from 0.01% to 30% by weight based on the total weight of the hybrid material. Preferably, these particles are nucleated from graphene surfaces and are chemically bonded to graphene surfaces. Preferably, the transition metal fluoride or chloride particles are in a nanowire, nano-tube, nano-disc, nano-ribbon, nano-belt, or nano platelet form having a diameter or thickness smaller than 100 nm (preferably from 1 nm to 10 nm). In this configuration, the transition metal fluoride or chloride particles are bonded to graphene surfaces, but the particles and graphene sheets do not form a hybrid particulate described earlier.

Another preferred embodiment of the present invention is a process for producing the aforementioned graphene-enhanced hybrid particulate. The process comprises (a) preparing a precursor mixture of graphene or graphene precursor with a cathode active material (e.g. $FeF_3$ or $CuF_2$) or active material precursor (e.g. $FeF_3\text{-}xH_2O$ or a reactant mixture of $Fe(NO_3)_3$ and $NH_4HF_2$); (b) dispensing the precursor mixture into secondary particles (particulates); and (c) thermally and/or chemically converting the precursor mixture particulates to the graphene-enhanced hybrid particulates.

The step of preparing a precursor mixture preferably comprises preparing a suspension of graphene or graphene precursor in a liquid medium and mixing a cathode active material or active material precursor in the suspension to form a multi-component suspension. The process preferably further comprises a step of drying the multi-component suspension to form the precursor mixture. If this drying process includes using a spray-drying, spray-pyrolysis, ultrasonic-spraying, or fluidized-bed drying procedure, the dried mixture is in a form of the hybrid particulate. Alternately, a freeze-drying process could be used. A drying step is typically followed by a step of converting, which can involve a sintering, heat-treatment, spray-pyrolysis, or fluidized bed drying or heating procedure. The step of converting may also comprise a procedure of chemically or thermally reducing the graphene precursor (e.g. GO) to reduce or eliminate oxygen content and other non-carbon elements of the graphene precursor. Most preferably, the final heat treatment or sintering of the precursor to the cathode active material (e.g., $CuF_2$ and $FeCl_3$) is conducted concurrently with the thermal reduction step of graphene precursor (e.g. graphene oxide). Both treatments can be conducted at 700° C., for instance.

A commonly used chemical method of producing graphene involves producing graphene oxide (GO) or graphene fluoride first, which is then chemically or thermally reduced to graphene. The graphene sheets in the graphene-enhanced particulate typically have an oxygen content less than 25% by weight and can have an oxygen content less than 5% by weight. Most typically, the graphene sheet has an oxygen content in the range of 5% to 25% by weight.

The step of preparing the precursor mixture may comprise: A) dispersing or exposing a laminar graphite material in a fluid of an intercalant and/or an oxidant to obtain a graphite intercalation compound (GIC) or graphite oxide (GO); B) exposing the resulting GIC or GO to a thermal shock at temperature for a period of time sufficient to obtain exfoliated graphite or graphite worms; C) dispersing the exfoliated graphite or graphite worms in a liquid medium containing an acid, an oxidizing agent, and/or an organic solvent at a desired temperature for a duration of time until the exfoliated graphite is converted into a graphene oxide dissolved in the liquid medium to form a graphene solution; D) adding a desired amount of the cathode precursor material to the graphene solution to form the precursor mixture in a suspension, slurry or paste form.

Alternatively, the step of preparing the precursor mixture comprises: (a) preparing a suspension containing pristine nano graphene platelets (NGPs) dispersed in a liquid medium; (b) adding an acid and/or an oxidizing agent into the suspension at a temperature for a period of time sufficient to obtain a graphene solution or suspension; and (c) adding a desired amount of cathode active material or precursor in the graphene solution or suspension to form a paste or slurry.

The invention also provides a lithium battery cathode comprising multiple graphene-enhanced cathode hybrid particulates, or simply a hybrid material, as described above. Typically, in a lithium ion battery featuring a cathode comprising multiple graphene-enhanced particulates of the present invention, these multiple particulates are typically packed together with graphene sheets forming a three-dimensional network of electron-conducting pathways.

The invention also provides a lithium battery (i.e. a lithium metal battery or lithium ion battery) comprising an anode, a cathode of the present invention, an optional separator disposed between the anode and the cathode, and electrolyte in physical contact with both the anode and the cathode. The separator may not be needed if the electrolyte is a polymer electrolyte, semi-solid state electrolyte, or solid-state electrolyte. The anode may contain lithium metal (e.g. Li metal foil) as the anode active material in a lithium metal secondary battery. The anode may contain a pre-lithiated material (e.g. pre-lithiated graphite, pre-lithiated carbon, and pre-lithiated Si particles, etc.) as an anode active material in a lithium-ion cell.

Thus, the anode active material may be selected from the group consisting of: (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide; (f) prelithiated versions thereof; (g) particles of Li, Li alloy, or surface-stabilized Li; and (h) combinations thereof Preferably, the anode active material contains a prelithiated Si, prelithiated Ge, prelithiated Sn, prelithiated $SnO_x$, prelithiated $SiO_x$, prelithiated iron oxide, prelithiated $VO_2$, prelithiated $Co_3O_4$, prelithiated $Ni_3O_4$, or a combination thereof, wherein x=1 to 2.

BRIEF DESCRIPTION OF THE DRAWINGS

FIG. 1 (B) another particulate according to another preferred embodiment of the present invention (containing some carbon component).

DETAILED DESCRIPTION OF PREFERRED EMBODIMENTS

Figure 1A:
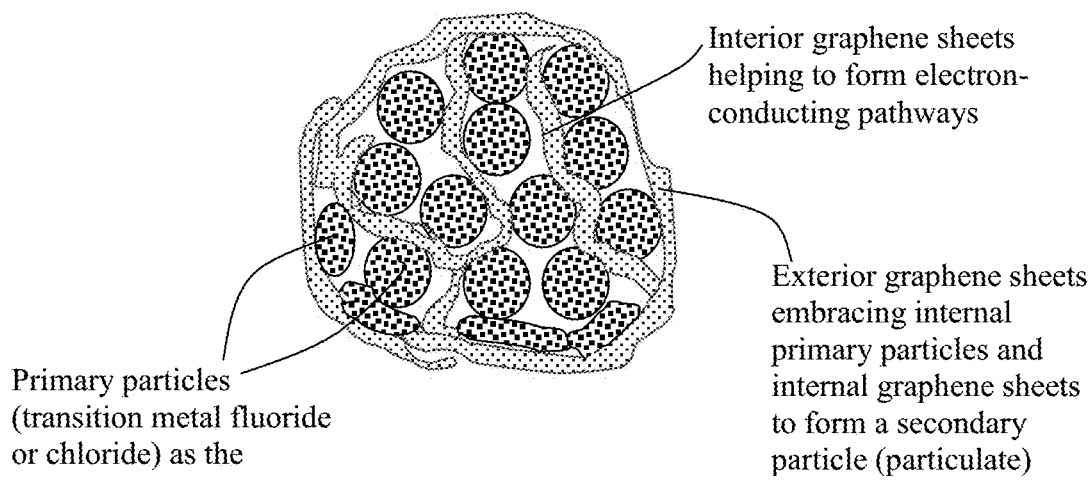
FIG. 1 (A) Schematic of a graphene-enhanced hybrid particulate according to a preferred embodiment of the present invention.

In conventional lithium-ion batteries now widely used in various industries (e.g. portable devices, such as smart phones, and EVs), the operation of cathode active materials (e.g. $LiCoO_2$, $LiMn_2O_4$, $LiFePO_4$, etc.) is all based on the lithium intercalation mechanism. However, lithium intercalation alone does not provide adequate lithium storage capability. The instant invention is directed at conversion reaction-based lithium storage mechanisms, in place of or in addition to the intercalation mechanism. In conversion reactions, the transition-metal, M, of an initial $MX_y$ species (X=F or Cl) is reduced by lithium to give LiX and the pure metal, M. The involved materials could greatly enhance the lithium storage capability of the cathode and, hence, the energy density of Li-ion cells. The reason for such high energy densities lies in the possibility for the transition metal to pass through various oxidation states involving more than one electron. For example, $FeF_3$ could potentially reach 712 mAh/g if the 3-electron reactions are allowed to be completed. In contrast, in $LiFePO_4$, only the Fe(III)/Fe(II) couple will be active, delivering a theoretical maximum of only 170 mAh/g (4.2 times less than that of iron trifluoride).

Unfortunately, due to various technical reasons (e.g. extremely low electrical conductivity, poor contact between active material and conductive filler, large active material particle size, poor active material utilization rate, significant volume changes during lithiation/delithiation, etc.), the maximum lithium storage capacities of all transition metal fluoride or chloride materials have not been fully realized. Actually, what has been achieved thus far typically has fallen short of the theoretical capacity by a factor of 2-5. The present invention has overcome these highly challenging problems and enabled all the transition metal fluoride or chloride materials to more fully realize their lithium storage capability.

The invention provides a graphene-enabled hybrid particulate for use as a lithium battery cathode active material. This hybrid particulate is formed of a single or a plurality of graphene sheets and a single or a plurality of fine cathode active material particles, selected from a transition metal fluoride or chloride and having a size from 1 nm to 10 μm (preferably <1 more preferably <100 nm, and most preferably from 1 to 10 nm). The graphene sheets and the metal fluoride or chloride particles are mutually bonded or agglomerated into a secondary particle (the hybrid particulate) containing an exterior graphene sheet or multiple exterior graphene sheets embracing the cathode active material particles. The hybrid particulate has an electrical conductivity no less than $10^4$ S/cm and the graphene is in an amount of from 0.01% to 30% by weight based on the total weight of graphene and the cathode active material combined. Preferably and typically, the hybrid particulate further contains interior graphene sheets in physical contact with the fine cathode active material particles and the exterior graphene sheet(s). Further preferably, the preparation is such that the metal fluoride or chloride nanocrystals are preferentially nucleated from graphene surfaces.

Preferably, the transition metal fluoride or chloride is selected from the group consisting of $CoF_3$, $MnF_3$, $FeF_3$, $VF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, and combinations thereof. Preferably, graphene sheets include pristine graphene, graphene oxide, reduced graphene oxide, graphene fluoride, graphene chloride, nitrogenated graphene, hydrogenated graphene, doped graphene, or functionalized graphene. Further preferably, graphene sheets include single-layer graphene or few layer graphene (having 2-10 graphene planes). More preferably, the graphene sheets contain 1-5 graphene planes, most preferably 1-3 graphene planes (i.e. single-layer, double-layer, or triple-layer graphene).

In certain embodiments, the invention provides a graphene-enabled hybrid material (not in a particulate form) for use as a lithium battery cathode active material. The hybrid material contains one or a plurality of graphene sheets and a single or a plurality of fine cathode active material particles that are bonded to a surface of the graphene sheets; wherein the cathode active material particles have a size smaller than 10 μm (preferably <1 μm, more preferably <100 nm, and most preferably <10 nm) and contain a transition metal fluoride or chloride selected from $CoF_3$, $MnF_3$, $VF_3$, $TiF_3$, $BiF_3$, $NiF_2$, $FeF_2$, $CuF_2$, $CuF$, $SnF_2$, $AgF$, $CuCl_2$, $FeCl_3$, $MnCl_2$, a combination thereof, or a combination thereof with $FeF_3$, and the graphene is in an amount of from 0.01% to 30% by weight based on the total weight of the hybrid material. Preferably, these particles are nucleated from graphene surfaces and are chemically bonded to graphene surfaces. Preferably, the transition metal fluoride or chloride particles are in a nanowire, nano-tube, nano-disc, nano-ribbon, nano-belt, or nano platelet form having a diameter or thickness smaller than 100 nm (preferably from 1 nm to 10 nm). In this configuration, the transition metal fluoride or chloride particles are bonded to graphene surfaces, but the particles and graphene sheets do not form a hybrid particulate described earlier.

Presumably, transition metal fluoride or chloride powders, such as $CoF_3$, $MnF_3$, $FeF_3$, $VF_3$, $TiF_3$, $BiF_3$, $NiF_2$, $FeF_2$, $CuF_2$, $CuF$, $SnF_2$, $AgF$, $CuCl_2$, $FeCl_3$, and $MnCl_2$ are all commercially available and the powder could be readily mixed with graphene sheets to make a hybrid, mixture, or composite material. However, these particles are typically very large in size (typically >10 μm in diameter), cannot be uniformly mixed with graphene sheets, cannot be naturally bonded to graphene surfaces, and/or cannot be readily made into graphene-embraced hybrid particulates. As such, the resulting metal fluoride/graphene or metal chloride/graphene composites, when used as a cathode active material, do not exhibit satisfactory electrochemical performances. In particular, they often fall short in cycle stability, rate capability, specific capacity, active material utilization efficiency, and energy density.

In order to overcome these challenges, we have developed new compositions and processes that enable the production of high-performance cathode active materials based on graphene-protected transition metal fluoride or chloride. The transition metal fluoride or chloride inside these particulate is preferably and typically in a nano particle or nano coating form that is bonded to surfaces of graphene sheets.

Several methods can be used to synthesize metal fluoride or chloride nanocrystals that are deposited on and bonded to graphene surfaces. The synthesis method typically involves mixing graphene oxide (GO) in a solution of two reactants and activating the reactions between the two reactants to form transition metal fluoride species in the solution phase. These GO molecules or sheets are surprisingly capable of bonding to the transition metal nanocrystals that are nucleated from graphene surfaces. Using $FeF_3$ as an example of metal fluoride, three main methods involving three different chemical routes are herein described.

The first method entails precipitating the graphene-supported $FeF_3$ nanoparticles from a solution reactants of $Fe(NO_3)_3$ ethanol solution and $NH_4HF_2$ aqueous solution in the presence of a desired amount of graphene. The solution is subjected to thorough stirring, with or without the assistance of polyethylene glycol (PEG, MW=20,000 g/mole), as a surfactant. The amount of GO is designed in such a manner that the final graphene proportion in the metal fluoride/graphene hybrid is typically from 0.01% to 50%, but more typically from 0.1% to 20% by weight. We observed that GO molecules per se are a good surfactant. The reaction products are $FeF_3$ nanocrystals bonded to graphene surfaces that remain dispersed in the ethanol-water solution. By removing the liquid component from the resulting suspension one obtains a hybrid graphene/FeF3 material. If, instead, the suspension is spray-dried, one obtains graphene-encapsulated $FeF_3$ particulates. Typically, graphene sheets are also present in the interior of the particulate.

The second method of synthesizing the graphene-supported $FeF_3$ nanoparticles entails mixing a solution of $Fe(NO_3)_3$ hexanol+$H_2O$ with a solution of $NH_4F$ hexanol+$H_2O$ together, with GO or GO+cetyltrimethyl ammonium bromide (CTAB) as a surfactant. After vigorous stirring for 2 h, one obtains $FeF_3$ nanocrystals chemically bonded to graphene surfaces. The suspension containing graphene-supported (bonded) $FeF_3$ nanocrystals and excess graphene sheets may be subjected to an operation of ultrasonic spraying onto a solid substrate to produce graphene-encapsulated particulates having exterior graphene sheets embracing the internal graphene-supported $FeF_3$ nanocrystals.

The third synthetic route is based on a liquid-solid-solution phase-transfer reaction commonly used in the preparation of rare-earth fluoride nanocrystals. A typical procedure includes mixing and stirring octadecylamine, linoleate acid, and ethanol together to form a homogeneous solution and then adding aqueous GO suspension, aqueous $Fe(NO_3)_3$ solution, and $NH_4HF_2$ solution sequentially or concurrently into the mixed organic solution. This reaction mixture may be stirred for about 10 min and then transferred to an autoclave, sealed, and hydrothermally treated at 120° C. for about 6 h. The products are suspensions containing graphene-bonded $FeF3$ nanocrystals and some excess isolated graphene sheets. These suspensions can then be spray-dried to obtain the graphene-encapsulated particulates. Without spray-drying, the products are basically composite particles having $FeF_3$ nanocrystals supported on graphene sheets.

The transition metal fluoride or chloride species can be in a nano sphere, nano-wire, nano-sheet, nano-belt, nano platelet, nano disc, or nano-tube form. For instance, the $FeF_3$ nanowires (NWs) can be prepared by a solution synthesis of α-iron fluoride trihydrate (α-$FeF_3.3H_2O$) NWs, followed by thermal dehydration of the α-$FeF_3.3H_2O$ NWs. The solution growth of α-$FeF_3.3H_2O$ NWs can be conducted under a low supersaturation condition without the use of surfactants.

Figure 1B:
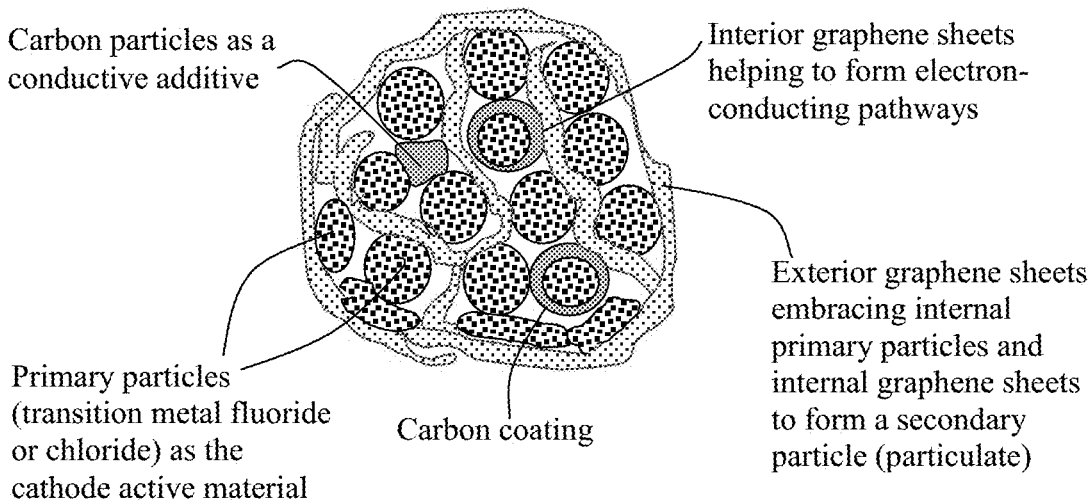

This invention provides a graphene-enhanced particulate for use as a lithium battery cathode active material. As illustrated in FIG. 1(A), the particulate is formed of a single or a plurality of graphene sheets and a plurality of fine cathode active material particles (primary particles of metal fluoride or chloride) with a size smaller than 10 μm (preferably and typically smaller than 1 μm, further preferably and typically <100 nm, and most preferably and typically <10 nm). The graphene sheets and the primary particles are mutually bonded or agglomerated into the particulate (also referred to as a secondary particle) with an exterior graphene sheet or multiple graphene sheets embracing the cathode active material particles. Some graphene sheets get incorporated into the interior of the particulate (herein referred to as internal or interior graphene sheets), providing additional electron-conducting paths. FIG. 1(B) shows another preferred embodiment, wherein an additional conductive additive (such as carbon black particles, carbon coating, or conducting polymer coating) is incorporated in the particulate.

The resulting particulate typically has an electrical conductivity no less than $10^{-4}$ S/cm (typically and preferably greater than $10^{-2}$ S/cm). The graphene component is in an amount of from 0.01% to 30% by weight (preferably between 0.1% to 20% by weight and more preferably between 0.5% and 10%) based on the total weight of graphene and the cathode active material combined. With the processes herein invented, the particulates tend to be approximately spherical or ellipsoidal in shape, which is a desirable feature.

A nano graphene platelet (NGP) or graphene sheet is composed of one basal plane (graphene plane) or multiple basal planes stacked together in the thickness direction. In a graphene plane, carbon atoms occupy a 2-D hexagonal lattice in which carbon atoms are bonded together through strong in-plane covalent bonds. In the c-axis or thickness direction, these graphene planes may be weakly bonded together through van der Waals forces. An NGP can have a platelet thickness from less than 0.34 nm (single layer) to 100 nm (multi-layer). For the present electrode use, the preferred thickness is <10 nm, more preferably <3 nm (or <10 layers), and most preferably single layer graphene.

Thus, the presently invented graphene-enhanced particulate preferably contains mostly single-layer graphene, but could make use of some few-layer graphene (less than 10 layers). The graphene sheet may contain a small amount (typically <25% by weight) of non-carbon elements, such as hydrogen, nitrogen, fluorine, and oxygen, which are attached to an edge or surface of the graphene plane. Graphene was recently discovered to exhibit the highest thermal conductivity of all existing materials. In addition to the electrical conductivity, this high thermal conductivity is clearly an advantageous property that could not be achieved by any other type of conductive additives.

Most significantly, we have found that, under the presently invented processing conditions, graphene sheets serve as preferential heterogeneous nucleation sites that dramatically increase the total number of the metal fluoride or chloride crystals and decrease the crystal size, most often down to smaller than 10 nm. This surprising feature turns out to be highly beneficial in terms of realizing the full lithium storage capability even at a high charge/discharge rate. Consequently, the resulting hybrid materials, especially when in a particulate form (the hybrid particulate), exhibit unprecedentedly high energy density, power density, and cycle stability.

Graphene sheets may be oxidized to various extents during their preparation, resulting in graphite oxide (GO) or graphene oxide. Hence, in the present context, graphene preferably or primarily refers to those graphene sheets containing no or low oxygen content; but, they can include GO of various oxygen contents. Further, graphene may be fluorinated to a controlled extent to obtain graphite fluoride, or can be doped using various dopants, such as boron and nitrogen.

As a preferred embodiment, the process of producing graphene-enhanced particulates comprises (i) preparing a precursor mixture of graphene or graphene precursor (e.g. GO) with a cathode active material or a precursor to the active material; and (ii) thermally and/or chemically converting the precursor mixture to the graphene-enhanced cathode particulate. Described in more detail, as an example, the process entails:

(a) dispersing or immersing a laminar graphite material (e.g., graphite powder) in a mixture of an intercalant and an oxidant (e.g., concentrated sulfuric acid and nitric acid, respectively) to obtain a graphite intercalation compound (GIC) or graphite oxide (GO);

(b) exposing the resulting GIC or GO to a thermal shock, preferably in a temperature range of 600-1,100° C. for a short period of time (typically 15 to 60 seconds), to obtain exfoliated graphite or graphite worms; and (c) dispersing exfoliated graphite in a liquid (e.g. water) and mechanically separating individual nano graphene platelets or sheets from graphite worms using, for instance, a high-shear mixer or an ultrasonicator to obtain a graphene or graphene precursor suspension; or, alternatively, (d) re-dispersing the exfoliated graphite to a liquid medium containing an acid (e.g., sulfuric acid), an oxidizing agent (e.g. nitric acid), or an organic solvent (e.g., NMP) at a desired temperature for a duration of time until the exfoliated graphite is converted into graphene oxide or graphene dissolved in the liquid medium. The acid is preferably a weak acid (such as diluted sulfuric acid) or a more environmentally benign acid, such as formic acid, acetic acid, citric acid, carboxylic acid, and combinations thereof. The exfoliated graphite, when dispersed in these acids, was gradually dispersed and essentially dissolved to form a graphene or graphene oxide solution or suspension. Although not a required operation, stirring, mechanical shearing, or ultrasonication can be used to accelerate the dispersion and dissolution step;

(e) dispersing a cathode active material or a cathode active material precursor to the graphene or graphene precursor solution or suspension prepared in step (c) or step (d) to obtain a precursor mixture suspension; and (f) dispersing the precursor mixture to form precursor mixture droplets and thermally and/or chemically converting the droplets into the graphene-enhanced cathode particulates.

The carboxylic acid used in step (d) may be selected from the group consisting of aromatic carboxylic acid, aliphatic or cycloaliphatic carboxylic acid, straight chain or branched chain carboxylic acid, saturated and unsaturated monocarboxylic acids, dicarboxylic acids and polycarboxylic acids that have 1-10 carbon atoms, alkyl esters thereof, and combinations thereof. Preferably, the carboxylic acid is selected from the group consisting of saturated aliphatic carboxylic acids of the formula $H(CH_2)_n COOH$, wherein n is a number of from 0 to 5, including formic, acetic, propionic, butyric, pentanoic, and hexanoic acids, anydrides thereof, reactive carboxylic acid derivatives thereof, and combinations thereof. The most preferred carboxylic acids are formic acid and acetic acid.

In step (e), carbon particles may be added along with the cathode active material particles (if the process begins with previously made transition metal fluoride or chloride particles). Alternatively, the cathode active material particles may be coated with a thin layer of carbon before they are mixed with the graphene suspension. For instance, micron-, sub-micron, or nano-scaled $FeF_3$ particles may be mixed into a solution containing a carbon precursor (e.g. sugar in water or phenolic resin in a solvent). The liquid component is then removed from the resulting mixture suspension or paste to obtain sugar- or resin-coated $FeF_3$ particles. These coated particles are then heat-treated at a temperature of 500-1,000° C. to obtain carbon-coated particles. These particles are then added to the graphene solution or suspension.

Figure 2:
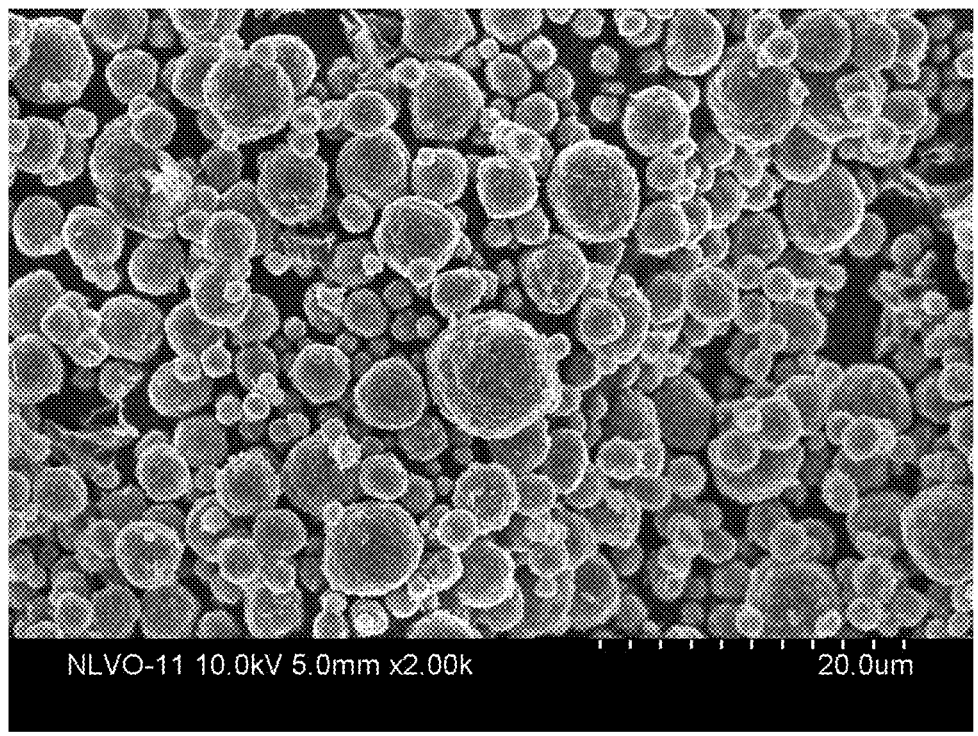
FIG. 2 SEM image of graphene-enhanced hybrid particulates comprising $FeF_3$ particles and graphene sheets in and around the particulate. Graphene sheets embrace and protect the primary particles ($FeF_3$ particles and interior graphene sheets) to form secondary particles (particulates) that are easier to handle in a real cathode production environment.

FIG. 2 shows graphene-enhanced particulates comprising $FeF_3$ particles and graphene sheets in and around the particulate. Graphene sheets embrace and protect the primary particles to form secondary particles (particulates) that are easier to handle in a real cathode production environment. The notion that the exterior particulate surface is encapsulated by highly conductive graphene sheets implies that these sheets can naturally form a 3-D network of electron-conducting paths when multiple particulates are packed together in a cathode.

Figure 3:
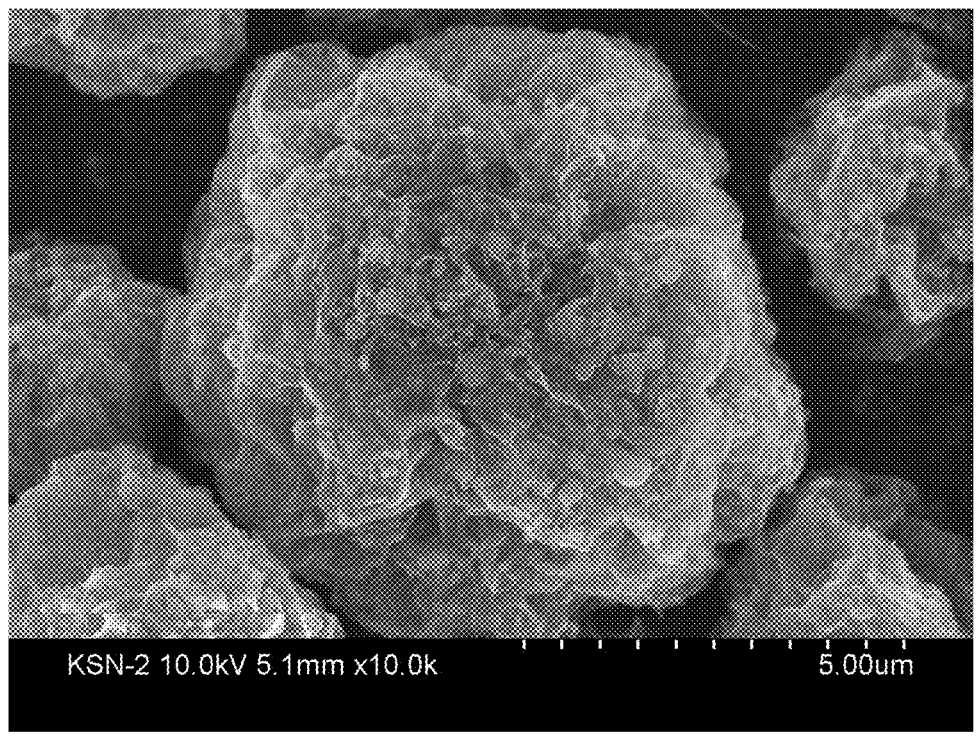
FIG. 3 SEM image of graphene-enhanced hybrid particulates containing therein carbon-coated $CuF_2$ particles embraced by graphene sheets.
Figure 4:
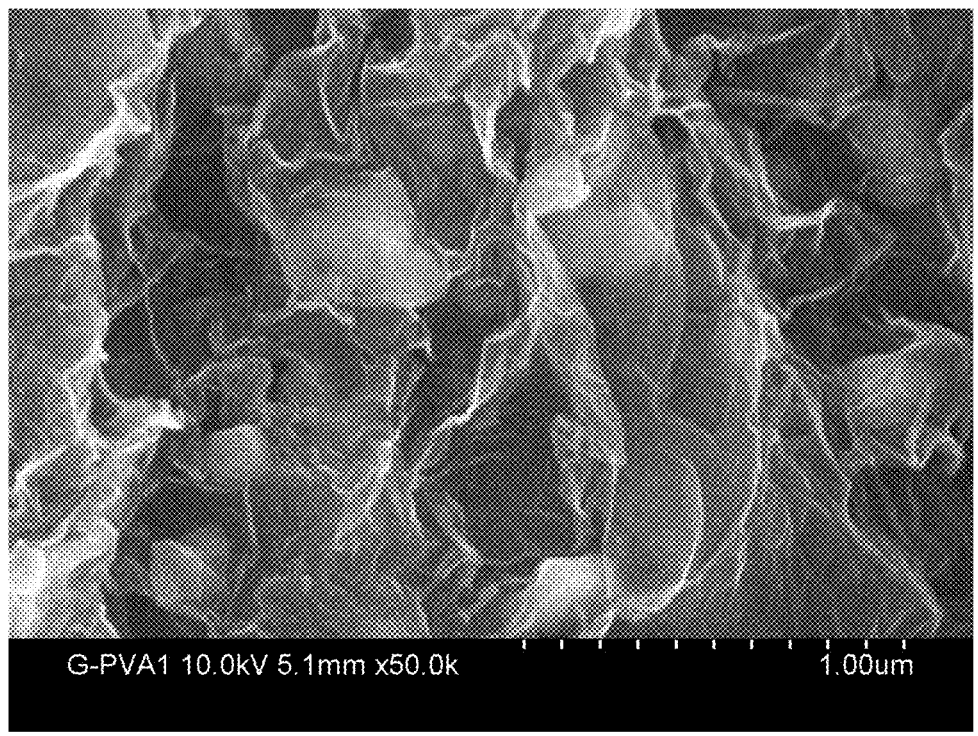
FIG. 4 SEM image of graphene-enhanced hybrid particulates comprising graphene sheets in and around the particulate. Graphene sheets embrace and protect the primary particles ($MnF_2$ particles and interior graphene sheets) to form secondary particles (particulates) that are more uniform in particle sizes and are larger in average size (~5-10 μm) than the primary particles and, hence, more conducive to slurry production and electrode fabrication.

FIG. 3 shows an SEM image of graphene-enhanced particulates containing therein carbon-coated $CuF_2$ particles embraced by graphene sheets. FIG. 4 shows an SEM image of graphene-enhanced hybrid particulates comprising graphene sheets in and around the particulate. Graphene sheets embrace and protect the primary particles ($MnF_2$ particles and interior graphene sheets) to form secondary particles (particulates) that are more uniform in particle sizes and are larger in average size (~5-10 μm) than the primary particles and, hence, more conducive to slurry production and electrode fabrication using existing production equipment. These hybrid particulates were found to lead to cathodes that have a higher tap density (weight per volume of the electrode), which is a very important parameter for a cathode.

Figure 5:
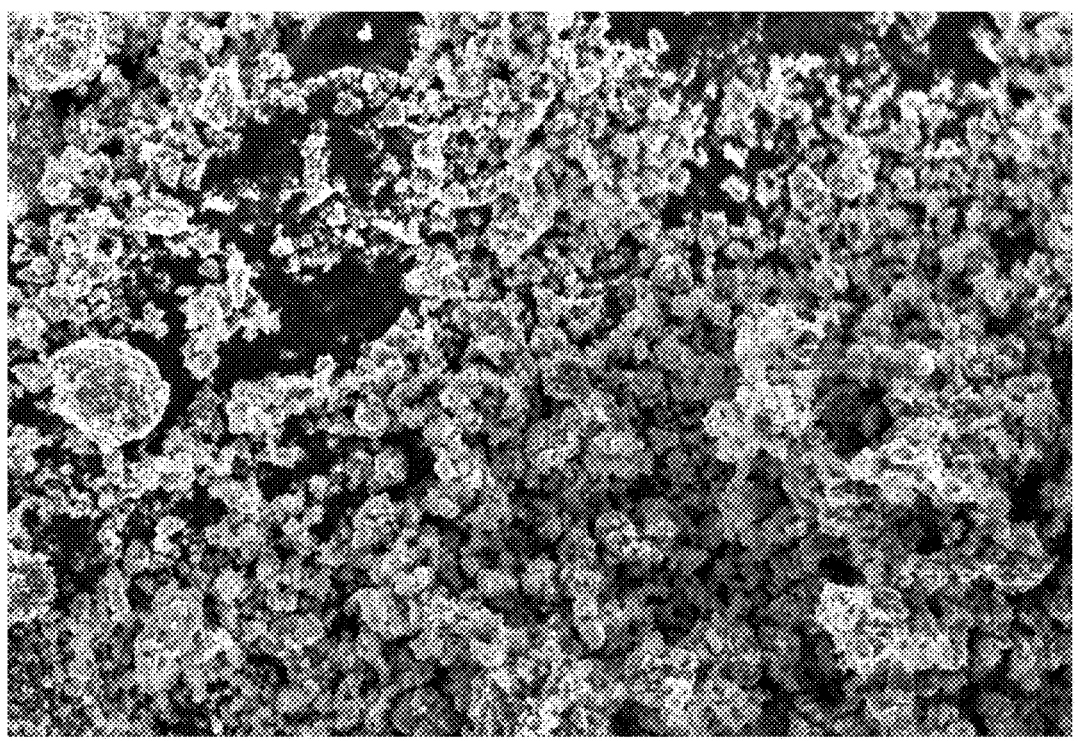
FIG. 5 A mass of cathode active material primary particles.

FIG. 5 shows an SEM image of a mass of primary $CuF_2$ particles, which indicates the presence of a very broad particle size distribution containing many ultra-fine particles that are not amenable to easy fabrication of a cathode with a high tap density.

As another preferred embodiment, the process may begin with the production of a precursor solution or suspension of pristine graphene (non-oxidized graphene) directly from graphite particles, which is followed by the addition of a cathode active material or precursor to the cathode active material to this solution or suspension to obtain a precursor mixture. The production of a precursor solution or suspension may include the following steps:

(a) Preparing a suspension containing pristine nano graphene platelets (NGPs) dispersed in a liquid medium using, for instance, direct ultrasonication (e.g., a process disclosed by us in U.S. patent application Ser. No. 11/800,728 (May 8, 2007));

(b) Optionally removing some of the liquid from the suspension;

(c) Adding a desired amount of a cathode active material or a precursor to a cathode active material to obtain a precursor mixture suspension or solution;

(d) Removing the liquid from the suspension to obtain a precursor mixture solid; and (e) Thermally and/or chemically converting the precursor mixture solid to the graphene-enhanced cathode particulate.

For the preparation of a cathode electrode, multiple graphene-enhanced particulates are mixed with a binder solution (e.g., PVDF in NMP) to obtain a slurry or paste. A desired amount of the slurry or paste is then coated onto a current collector, allowing the liquid to evaporate and leaving behind an electrode bonded to a surface of a current electrode. For examples, lithium cobalt oxide particles embraced by graphene sheets may be added to a solution containing a solvent (NMP). The resulting paste may be coated onto an aluminum foil as a current collector to form a coating layer of 50-500 μm thick. By allowing the solvent to vaporize one obtains a positive electrode (cathode) for a lithium battery.

In the aforementioned examples, the starting material for the preparation of graphene sheets or NGPs is a graphitic material that may be selected from the group consisting of natural graphite, artificial graphite, graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof.

Graphite oxide may be prepared by dispersing or immersing a laminar graphite material (e.g., powder of natural flake graphite or synthetic graphite) in an oxidizing agent, typically a mixture of an intercalant (e.g., concentrated sulfuric acid) and an oxidant (e.g., nitric acid, hydrogen peroxide, sodium perchlorate, potassium permanganate) at a desired temperature (typically 0-70° C.) for a sufficient length of time (typically 30 minutes to 5 days). In order to reduce the time required to produce a precursor solution or suspension, one may choose to oxidize the graphite to some extent for a shorter period of time (e.g., 30 minutes) to obtain graphite intercalation compound (GIC). The GIC particles are then exposed to a thermal shock, preferably in a temperature range of 600-1,100° C. for typically 15 to 60 seconds to obtain exfoliated graphite or graphite worms, which are optionally (but preferably) subjected to mechanical shearing (e.g. using a mechanical shearing machine or an ultrasonicator) to break up the graphite flakes that constitute a graphite worm. The un-broken graphite worms or individual graphite flakes are then re-dispersed in water, acid, or organic solvent and ultrasonicated to obtain a graphene polymer solution or suspension.

The pristine graphene material is preferably produced by one of the following three processes: (A) Intercalating the graphitic material with a non-oxidizing agent, followed by a thermal or chemical exfoliation treatment in a non-oxidizing environment; (B) Subjecting the graphitic material to a supercritical fluid environment for inter-graphene layer penetration and exfoliation; or (C) Dispersing the graphitic material in a powder form to an aqueous solution containing a surfactant or dispersing agent to obtain a suspension and subjecting the suspension to direct ultrasonication.

In Procedure (A), a particularly preferred step comprises (i) intercalating the graphitic material with a non-oxidizing agent, selected from an alkali metal (e.g., potassium, sodium, lithium, or cesium), alkaline earth metal, or an alloy, mixture, or eutectic of an alkali or alkaline metal; and (ii) a chemical exfoliation treatment (e.g., by immersing potassium-intercalated graphite in ethanol solution).

In Procedure (B), a preferred step comprises immersing the graphitic material to a supercritical fluid, such as carbon dioxide (e.g., at temperature T>31° C. and pressure P>7.4 MPa) and water (e.g., at T>374° C. and P>22.1 MPa), for a period of time sufficient for inter-graphene layer penetration (tentative intercalation). This step is then followed by a sudden de-pressurization to exfoliate individual graphene layers. Other suitable supercritical fluids include methane, ethane, ethylene, hydrogen peroxide, ozone, water oxidation (water containing a high concentration of dissolved oxygen), or a mixture thereof.

In Procedure (C), a preferred step comprises (a) dispersing particles of a graphitic material in a liquid medium containing therein a surfactant or dispersing agent to obtain a suspension or slurry; and (b) exposing the suspension or slurry to ultrasonic waves (a process commonly referred to as ultrasonication) at an energy level for a sufficient length of time to produce the separated nano-scaled platelets, which are pristine, non-oxidized NGPs.

NGPs can be produced with an oxygen content no greater than 25% by weight, preferably below 20% by weight, further preferably below 5%. Typically, the oxygen content is between 5% and 20% by weight. The oxygen content can be determined using chemical elemental analysis and/or X-ray photoelectron spectroscopy (XPS).

The laminar graphite materials used in the prior art processes for the production of the GIC, graphite oxide, and subsequently made exfoliated graphite, flexible graphite sheets, and graphene platelets were, in most cases, natural graphite. However, the present invention is not limited to natural graphite. The starting material may be selected from the group consisting of natural graphite, artificial graphite (e.g., highly oriented pyrolytic graphite, HOPG), graphite oxide, graphite fluoride, graphite fiber, carbon fiber, carbon nano-fiber, carbon nano-tube, mesophase carbon micro-bead (MCMB) or carbonaceous micro-sphere (CMS), soft carbon, hard carbon, and combinations thereof. All of these materials contain graphite crystallites that are composed of layers of graphene planes stacked or bonded together via van der Waals forces. In natural graphite, multiple stacks of graphene planes, with the graphene plane orientation varying from stack to stack, are clustered together. In carbon fibers, the graphene planes are usually oriented along a preferred direction. Generally speaking, soft carbons are carbonaceous materials obtained from carbonization of liquid-state, aromatic molecules. Their aromatic ring or graphene structures are more or less parallel to one another, enabling further graphitization. Hard carbons are carbonaceous materials obtained from aromatic solid materials (e.g., polymers, such as phenolic resin and polyfurfuryl alcohol). Their graphene structures are relatively randomly oriented and, hence, further graphitization is difficult to achieve even at a temperature higher than 2,500° C. But, graphene sheets do exist in these carbons.

The presently invented process typically resulted in nano graphene sheets that, when formed into a thin film with a thickness no greater than 100 nm, exhibits an electrical conductivity of at least 10 S/cm, often higher than 100 S/cm, and, in many cases, higher than 1,000 S/cm. The resulting NGP powder material typically has a specific surface area of from approximately 300 $m^2/g$ to 2,600 $m^2/g$ and, in many cases, comprises single-layer graphene or few-layer graphene sheets.

When these graphene sheets are combined with cathode active material particles to form graphene-enhanced hybrid particulates, these hybrid particulates (when packed into a dry electrode) exhibit an electrical conductivity no less than $10^{-4}$ S/cm (typically and preferably greater than $10^{-2}$ S/cm and most typically and preferably greater than 1 S/cm). The graphene component is in an amount of from 0.01% to 30% by weight (preferably between 0.1% to 20% by weight and more preferably between 0.5% and 10%) based on the total weight of graphene and the cathode active material combined. Preferably, the particulates are approximately spherical in shape.

Graphene sheets may be oxidized to various extents during their preparation, resulting in graphite oxide or graphene oxide (GO). Hence, in the present context, graphene preferably or primarily refers to those graphene sheets containing no or low oxygen content; but, they can include GO of various oxygen contents. Further, graphene may be fluorinated to a controlled extent to obtain graphene fluoride.

The NGPs may be obtained from exfoliation and platelet separation of a natural graphite, synthetic graphite, highly oriented pyrolytic graphite, graphite fiber, carbon fiber, carbon nano-fiber, graphitic nano-fiber, spherical graphite or graphite globule, meso-phase micro-bead, meso-phase pitch, graphitic coke, or graphitized polymeric carbon.

For instance, the graphene oxide may be obtained by immersing powders or filaments of a starting graphitic material (e.g. natural graphite powder) in an oxidizing liquid medium (e.g. a mixture of sulfuric acid, nitric acid, and potassium permanganate) in a reaction vessel at a desired temperature for a period of time (typically from 0.5 to 96 hours, depending upon the nature of the starting material and the type of oxidizing agent used). The resulting graphite oxide particles may then be subjected to thermal exfoliation or ultrasonic wave-induced exfoliation to produce GO sheets.

Pristine graphene may be produced by direct ultrasonication (also known as liquid phase production) or supercritical fluid exfoliation of graphite particles. These processes are well-known in the art. Multiple pristine graphene sheets may be dispersed in water or other liquid medium with the assistance of a surfactant to form a suspension.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultrasonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

Optionally, the particulate further comprises a carbon material in electronic contact with the cathode active material and a graphene sheet. This carbon material can be a polymeric carbon, amorphous carbon, chemical vapor deposition (CVD) carbon, carbon black (CB), acetylene black (AB), activated carbon, fine expanded graphite particle with a dimension smaller than 100 nm, artificial graphite particle, and/or natural graphite particle. Preferably, the carbon material is coated on at least one of the cathode active material particles and more preferably on the surface of all primary particles, which are than embraced by a graphene sheet or a plurality of graphene sheets.

The following examples serve to provide the best modes of practice for the present invention and should not be construed as limiting the scope of the invention.

Example 1: Graphene Oxide from Sulfuric Acid Intercalation and Exfoliation of MCMBs MCMB (meso-carbon microbeads) were supplied by China Steel Chemical Co. This material has a density of about 2.24 g/cm$^3$ with a median particle size of about 16 μm. MCMBs (10 grams) were intercalated with an acid solution (sulfuric acid, nitric acid, and potassium permanganate at a ratio of 4:1:0.05) for 48 hours. Upon completion of the reaction, the mixture was poured into deionized water and filtered. The intercalated MCMBs were repeatedly washed in a 5% solution of HCl to remove most of the sulphate ions. The sample was then washed repeatedly with deionized water until the pH of the filtrate was neutral. The slurry was dried and stored in a vacuum oven at 60° C. for 24 hours. The dried powder sample was placed in a quartz tube and inserted into a horizontal tube furnace pre-set at a desired temperature, 800° C.-1,100° C. for 30-90 seconds to obtain graphene samples. A small quantity of graphene was mixed with water and ultrasonicated at 60-W power for 10 minutes to obtain a suspension. A small amount was sampled out, dried, and investigated with TEM, which indicated that most of the NGPs were between 1 and 10 layers. The oxygen content of the graphene powders (GO or RGO) produced was from 0.1% to approximately 25%, depending upon the exfoliation temperature and time.

The GO or RGO sheets were then used as heterogeneous nucleation sites for promoting the formation of transition metal fluoride or chloride crystals. The synthesis method of producing graphene-bonded/nucleated nanocrystals involves precipitating the $FeF_3$ nanoparticles from a solution reactant mixture of $Fe(NO_3)_3$ ethanol solution (0.25 mol/L) and $NH_4HF_2$ aqueous solution (1.5 mol/L) in the presence of a desired amount of GO. The resulting suspension was thoroughly stirred, using graphene oxide (GO), with or without the assistance of polyethylene glycol (PEG, MW=20,000 g/mole, 0.005 mol/L), as a surfactant. The amount of GO was designed in such a manner that the final graphene proportion in the metal fluoride/graphene hybrid was typically from 0.01% to 50%, but more typically from 0.1% to 20% by weight. We observed that GO molecules per se are a good surfactant. The suspension was then spray-dried to obtain graphene-encapsulated $FeF_3$ particulates, containing graphene sheets embracing both primary particles and internal graphene sheets.

Example 2: Oxidation and Exfoliation of Natural Graphite

Graphite oxide was prepared by oxidation of graphite flakes with sulfuric acid, sodium nitrate, and potassium permanganate at a ratio of 4:1:0.05 at 30° C. for 48 hours, according to the method of Hummers [U.S. Pat. No. 2,798,878, Jul. 9, 1957]. Upon completion of the reaction, the mixture was poured into deionized water and filtered. The sample was then washed with 5% HCl solution to remove most of the sulfate ions and residual salt and then repeatedly rinsed with deionized water until the pH of the filtrate was approximately 4. The intent was to remove all sulfuric and nitric acid residue out of graphite interstices. The slurry was dried and stored in a vacuum oven at 60° C. for 24 hours.

The dried, intercalated (oxidized) compound was exfoliated by placing the sample in a quartz tube that was inserted into a horizontal tube furnace pre-set at 1,050° C. to obtain highly exfoliated graphite. The exfoliated graphite was dispersed in water along with a 1% surfactant at 45° C. in a flat-bottomed flask and the resulting graphene oxide (GO) suspension was subjected to ultrasonication for a period of 15 minutes. In one set of experiments, fine particles of metal fluoride or metal chloride was added to a graphene-water suspension, which was then spray-dried to produce separate samples of particulates containing graphene sheets embracing primary particles and internal graphene sheets.

Another set of experiments was conducted to synthesize iron fluoride-graphene hybrids or nanocomposites. In one experiment, 50 mg of graphene prepared in the previous steps was added to ethanol solution containing HF in a 200 mL beaker. The glass beaker was sealed with Parafilm and placed in ultrasonic water bath for 1 h to ensure good dispersion of graphene sheets and create defects for $FeF_3$-$3H_2O$ nucleation sites. Subsequently, an appropriate ratio of $Fe(NO_3)_3$ was added into the dispersion. The resulting mixture was then heated in a vacuum oven at 60° C. for 5-10 h; the final mass of $FeF_3$ active cathode nanoparticles deposited on graphene sheets can be controlled via tuning the reaction time. Upon completion of the reaction, the mixture was washed several times with ethanol, and dried in an oven at 60° C. to obtain the hydrated iron fluoride-graphene mixture or nanocomposites. Separately, drying of the mixture was also conducted using a spray dryer to obtain hybrid particulates. Finally, a heat treatment in a $N_2$ atmosphere was performed to remove crystallized water in hydrated iron fluoride at 150° C. for 10 h. For comparison, neat iron fluoride particles were synthesized via similar chemical routes except that graphene sheets were not included during the crystallization of iron fluoride particles.

Example 3: Preparation of Pristine Graphene-Protected Particulates

Pristine graphene sheets were produced by using the direct ultrasonication or liquid-phase exfoliation process. In a typical procedure, five grams of graphite flakes, ground to approximately 20 μm in sizes, were dispersed in 1,000 mL of deionized water (containing 0.1% by weight of a dispersing agent, Zonyl® FSO from DuPont) to obtain a suspension. An ultrasonic energy level of 85 W (Branson 5450 Ultrasonicator) was used for exfoliation, separation, and size reduction of graphene sheets for a period of 15 minutes to 2 hours. The resulting graphene sheets were pristine graphene that had never been oxidized and were oxygen-free and relatively defect-free. There are no other non-carbon elements. Fine particles of $FeF_3$ and $FeCl_2$, separately, were added to a graphene-water suspension, which were then spray-dried to produce separate samples of particulates containing graphene sheets embracing primary particles and internal graphene sheets.

Additionally, graphene-supported $FeF_3$ nanoparticles were obtained by a process that entailed mixing a solution of 0.048 mol/L $Fe(NO_3)_3$ in "hexanol+$H_2O$ (1.06:1 mol. %)" with a solution of 0.143 mol/L $NH_4F$ in "hexanol+$H_2O$ (1.06:1 mol. %)" together with GO or GO+a 0.327 mol/L of cetyltrimethyl ammonium bromide (CTAB) as a surfactant. After vigorous stirring for 2 h, one obtains $FeF_3$ nanocrystals chemically bonded on graphene surfaces. The suspension containing graphene-supported (bonded) $FeF_3$ nanocrystals and excess graphene sheets was then subjected to an operation of ultrasonic spraying onto a solid substrate to produce graphene-encapsulated particulates having exterior graphene sheets embracing the internal graphene-supported $FeF_3$ nanocrystals.

Example 4: Preparation of Graphene Fluoride (GF)-Protected $CuF_2$ and $MnCl_2$ Particulates Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). A pre-cooled Teflon reactor was filled with 20-30 mL of liquid pre-cooled $ClF_3$, and then the reactor was closed and cooled to liquid nitrogen temperature. Subsequently, no more than 1 g of HEG was put in a container with holes for $ClF_3$ gas to access the reactor. After 7-10 days, a gray-beige product with approximate formula $C_2F$ was formed. GF sheets were then dispersed in halogenated solvents to form suspensions. Fine particles of $CuF_2$ and $MnCl_2$ were separately added to GF-solvent suspensions, which were then spray-dried to produce separate samples of particulates containing graphene sheets embracing primary particles and internal graphene sheets.

Additionally, graphene-$CuF_2$ mixture sample was prepared by ball-milling commercial $CuF_2$ powder (Sigma-Aldrich 98%) and graphene fluoride sheets. Two ball-milling methods were employed, planetary ball-milling (PBM) and high energy ball-milling (HBM). Either 0.5 or 1 g of a mixture composed of $CuF_2$ and graphene fluoride sheets (90:10 wt. %) was prepared and placed into a milling jar in an Ar-filled glovebox. The jar was sealed with Parafilm before being transferred to the ball mill. For the PBM, a stainless steel jar with zirconia beads of various volume percentages (e.g. 40 and 70 vol. %) was used. The milling process was programmed for various periods of time at different speeds (300, 500, and 600 rpm). For the HBM, a zirconia container with zirconia balls was used and the milling was programmed for 45, 60, and 90 min.

Example 5: Preparation of Nitrogenataed Graphene-Protected Metal Fluoride Particulates Graphene oxide (GO), synthesized in Example 2, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene/urea mass ratios of 1/0.5, 1/1 and ½ are designated as N-1, N-2 and N-3 respectively and the nitrogen contents of these samples were 14.7, 18.2 and 17.5 wt. % respectively as determined by elemental analysis. These nitrogenataed graphene sheets remain dispersible in water.

The liquid-solid-solution phase-transfer reaction was used for the preparation of metal fluoride nanocrystals. In one experiment, the procedure included mixing and stirring 1 g of octadecylamine, 8 mL of linoleate acid, and 32 mL of ethanol together to form a homogeneous solution and then adding aqueous GO suspension, aqueous $Fe(NO_3)_3$ solution (1.25 g/15 mL distilled water), and $NH_4HF_2$ solution (0.53 g/15 mL distilled water) sequentially or concurrently into the mixed organic solution. This reaction mixture was stirred for about 10 min and then transferred to a 100 mL autoclave, sealed, and hydrothermally treated at 120° C. for about 6 h. The products were suspensions containing graphene-bonded $FeF_3$ nanocrystals and some excess isolated graphene sheets. Some of these suspensions were then spray-dried to obtain the graphene-encapsulated particulates. Some were dried in a vacuum oven. Without spray-drying, the products were basically composite particles having $FeF_3$ nanocrystals supported on and bonded to graphene sheets.

Some of the powder samples were further dried under vacuum at 80° C. and then calcined at 400° C. for 2 h under high-purity argon to remove the organic residues. For comparison, some $FeF_3$/C nanocomposites were prepared by mechanical ball-milling of the as-prepared $FeF_3$ nano powders (prepared without the presence of graphene sheets) and graphite together for 2 h ($FeF_3$/graphite) 1:1 by weight.

Example 6: Preparation of Particulates of Graphene-Protected $CoF_3$, $MnF_3$, and $TiF_3$ Particles For the preparation of graphene-protected particulates, an amount of a selected electrode active material powder, including fine particles of $CoF_3$, $MnF_3$, and $TiF_3$, was added to a desired amount of GO suspension to form a precursor mixture suspension with a solid content of approximately 10% by weight. After thorough mixing in an ultrasonication reactor, the suspension was then spray-dried to form the particulates of graphene oxide-protected $CoF_3$, $MnF_3$, and $TiF_3$ particles.

Example 7: Particulates of Graphene-Protected Metal Fluoride or Chloride Particles from Precursor Species The fabrication process of $FeF_3$/ACMB composite was performed by using Teflon or plastic ware. ACMB was introduced into excessive HF solution and sonicated for 2 h. CTAB was introduced into $FeCl_3$ solution and stirred for 30 min. After the stirring, the CTAB-$FeCl_3$ mixture solution was introduced into the ACMB-HF solution dropwise. The final solution was stirred for 24 h to complete the reaction. The product ($FeF_3$/ACMB composite) was separated from the solution by centrifuging at 3,000 rpm for 1 h. The precipitation was washed by absolute ethyl alcohol for five times and separated by filtration, followed by vacuum drying in vacuum chamber at 75° C. overnight. Finally, a heat treatment in ambient Ar at 170° C. for 10 h was performed to obtain $FeF_3$/ACMB. The weight ratio of ACMB to $FeF_3$ in the composite is 0.02. Neat $FeF_3$ was prepared by a similar method discussed above, but without adding ACMB.

An appropriate amount of $FeF_3$/ACMB or $FeF_3$ alone was slowly added into a GO suspension prepared in Example 2. In a separate sample, a small amount of phenolic resin was added to coat on surfaces of $FeF_3$ particles, which were heat-treated at 600° C. to obtain carbon-coated particles. The resulting suspensions were stirred for 2 hours under an argon flow to ensure a complete, homogeneous dispersion. The suspensions were then atomized and spray-dried to obtain spherical particulates of graphene-protected particles ($FeF_3$/ACMB, $FeF_3$, and carbon-coated $FeF_3$ particles, respectively). Hybrid particulates containing a wide range of graphene amounts were prepared. According to the starting graphene weight and the final total weight, the weight content of graphene (wt. %) in the composite particulates was found to be from about 0.5% to 85%.

Example 8: Preparation of Electrodes and Electrochemical Testing of Lithium Battery Cells Containing a Graphene-Protected Particulate Positive Electrode Several "dry" electrodes (without impregnation of liquid electrolyte) containing graphene-enhanced particulates were prepared by mixing the particulates with a liquid to form a paste without using a binder such as PVDF. The paste was cast onto a surface of a piece of glass, with the liquid medium removed to obtain a dry electrode. Another dry electrode was prepared by directly mixing metal fluoride or chloride primary particles with graphene sheets in an identical liquid to form a paste without using a binder. Again, the paste was then cast to form a dry electrode. The dry electrodes were for the evaluation of the effect of various conductive additives and/or protective materials on the electrical conductivity of an electrode.

For comparison purposes, several additional dry electrodes were prepared under exactly identical conditions, and the paste in each case was made to contain the same cathode active particles, but a comparable amount of other conductive additives: multi-walled carbon nano-tubes (CNTs), carbon black (Super-P from Timcal), a CNT/Super-P mixture at an 1/1 ratio, and a GO/Super-P mixture at an 1/1 ratio. The electrical conductivity of various dry electrodes was measured and plotted as a function of the weight % of the additive in FIG. 6(A) and FIG. 6(B).

Corresponding "wet" electrodes for incorporation in a battery cell were made to contain a PVDF binder. These electrodes were made into full cells containing prelithiated graphite or Si particles or lithium metal as an anode active material. For electrochemical testing, both pouch cells and coin cells were prepared. For the coin cells, the working electrodes were prepared by mixing 85 wt % active material (e.g. graphene-protected particulates, hybrid composites, and metal fluoride or chloride particles only, separately), 7 wt. % acetylene black (Super-P), and 8 wt % polyvinylidene fluoride (PVDF, 5 wt. % solid content) binder dissolved in N-methyl-2-pyrrolidinoe (NMP). After coating the slurries on a sheet of carbon fiber mat, the electrodes were dried at 120° C. in vacuum for 2 h to remove the solvent before pressing. Then, the electrodes were cut into a disk ($\phi$=12 mm) and dried at 100° C. for 24 h in vacuum. Electrochemical measurements were carried out using CR2032 (3V) coin-type cells and pouch cells. The CV measurements were carried out using an electrochemical workstation at a scanning rate of 1 mV/s.

Figure 6A:
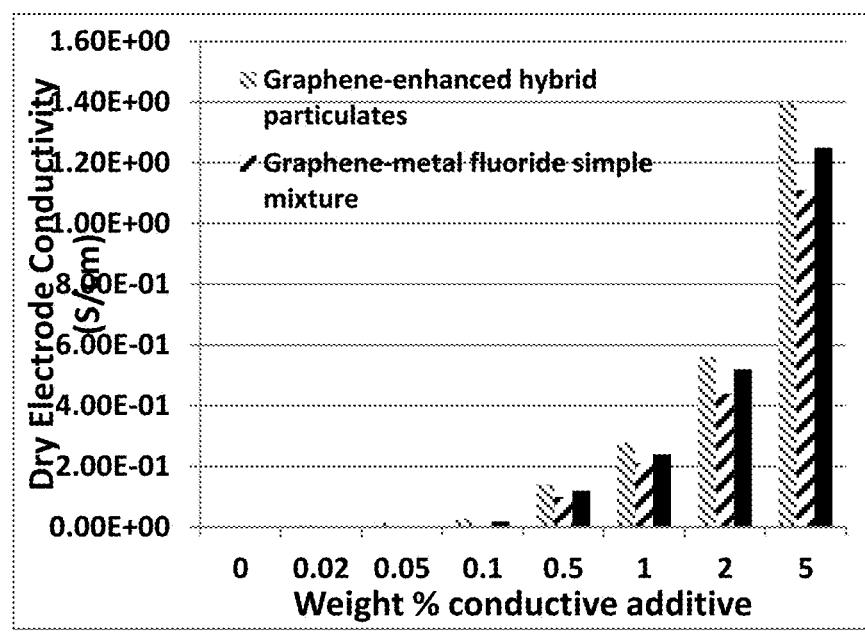
FIG. 6(A) Electrical conductivity data of three dry electrodes, one containing presently invented graphene-enhanced hybrid particulates of $FeF_3$ particles and graphene sheets, another containing a blend of $FeF_3$ particles and graphene sheets obtained by simple mixing of these two components, and the third containing $FeF_3$ nanocrystals nucleated from graphene surfaces.
Figure 10:
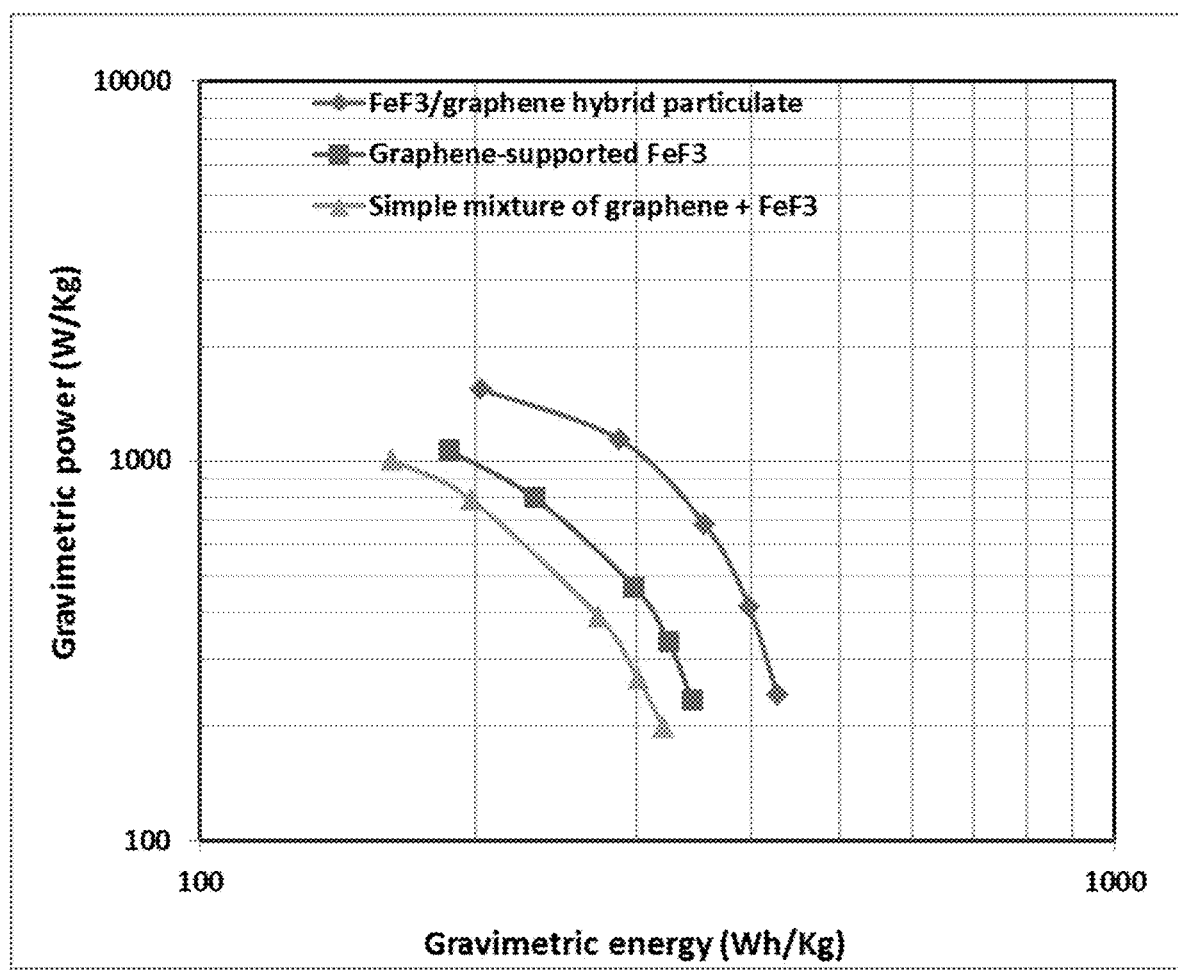
FIG. 10 The Ragone plots of three cells: a cell containing a cathode of graphene-enhanced hybrid particulates of $FeF_3$ particles/graphene, a cell containing a cathode of graphene-supported $FeF_3$ nanocrystals, and a cell containing a cathode of ball-milled $FeF_3$/graphene mixture.

FIG. 6(A) clearly demonstrates that graphene sheets embracing the primary particles of a cathode active material help the electrode achieve a state of percolation (characterized by the formation of a 3-D network of electron-conducting paths) at a weight % as low as 0.02%, as opposed to the percolation threshold of 0.5% by weight for a dry electrode containing primary particles simply mixed with graphene. The performance of the sample containing graphene surface-nucleated $FeF_3$ particles is better than that of the simple mixture, but lower than that of the hybrid particulate sample. The cathode featuring the presently invented hybrid particulates surprisingly delivers the best conductivity characteristics and the best energy density and power density values as well (FIG. 10).

Figure 6B:
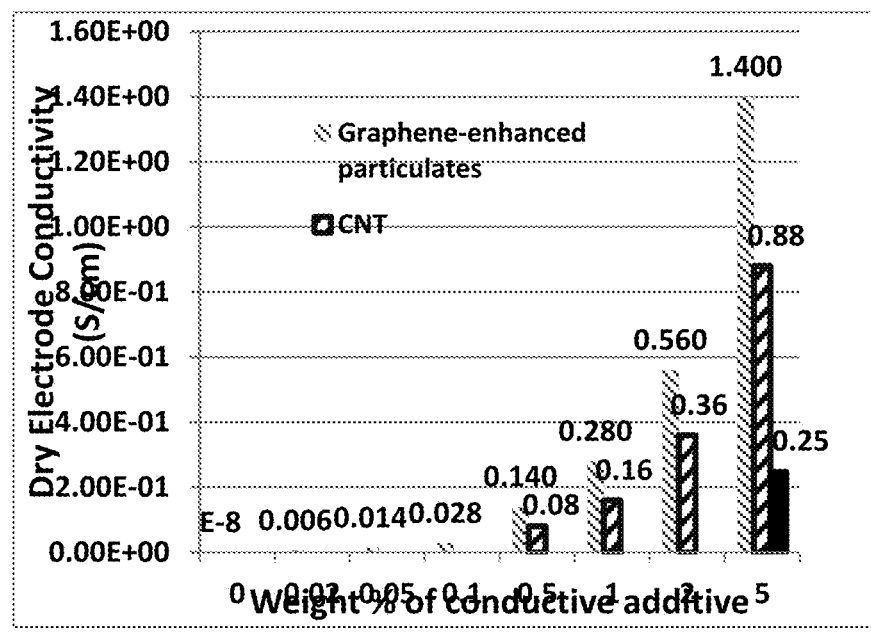
FIG. 6(B) Electrical conductivity data of three dry electrodes, one containing presently invented graphene-enhanced hybrid particulates of $FeF_3$ and graphene sheets, the second CNTs, and the third carbon black (Super-P from Timcal).

FIG. 6(B) shows that graphene sheets, when incorporated to form graphene-enhanced hybrid particulates of the present invention, provide exceptional electrical conductivity characteristics to the electrodes in terms of a much lower percolation threshold and higher electrical conductivity at a given weight % of additive as compared to the corresponding CNT-enhanced or carbon black-enhanced electrodes. The CB particles (Super-P) did not reach the point of percolation until about 3% by weight. Even at the same weight %, the graphene-enhanced particulates appear to provide higher conductivity to the electrode. These conductivity data clearly demonstrate that the graphene-enhanced particulate approach is a superior strategy for significantly improving the performance of a lithium battery electrode.

Table 1 below shows the superior performance of the presently invented graphene-enhanced particulates wherein the primary $MnF_3$ particles are pre-coated with carbon. These data show that, using the graphene-enhanced particulate approach, graphene sheets impart dramatically higher conductivity (by 60-fold) to the carbon-coated metal fluoride electrodes. The graphene-enhanced electrodes exhibit conductivity values that are 3-5 times higher than those of the electrodes containing 2% CNTs or carbon black (Super-P).

These results are very surprising and could not have been predicted based on existing knowledge. No prior art work has shown electrode performance that is anywhere near what the present invention has achieved.

TABLE 1

Dimensions, resistance, and resistivity of several dry electrodes containing carbon-coated $MnF_3$ particles and various conductive additives (all at approximately 2%).

|  | C-coated $MnF_3$ | C-coated $MnF_3$ + 2% Super-P | C-coated $MnF_3$ + 2% CNT | Graphene-enhanced C-coated $MnF_3$ |
|---|---|---|---|---|
| Thickness/cm | 0.33 | 0.34 | 0.33 | 0.34 |
| Area/cm² | 5.1 | 5.2 | 5.1 | 5.3 |
| R (in plane)/Ω | 375 | 24 | 22 | 4.5 |
| R (though plane)/Ω | 19.8 | 1.3 | 2.8 | 0.21 |
| ρ (in-plane resistivity)/Ω cm | 194 | 10.19 | 8.5 | 2.8 |
| ρ (through plane)/Ω cm | 123.8 | 8.2 | 7.3 | 1.5 |

Figure 7:
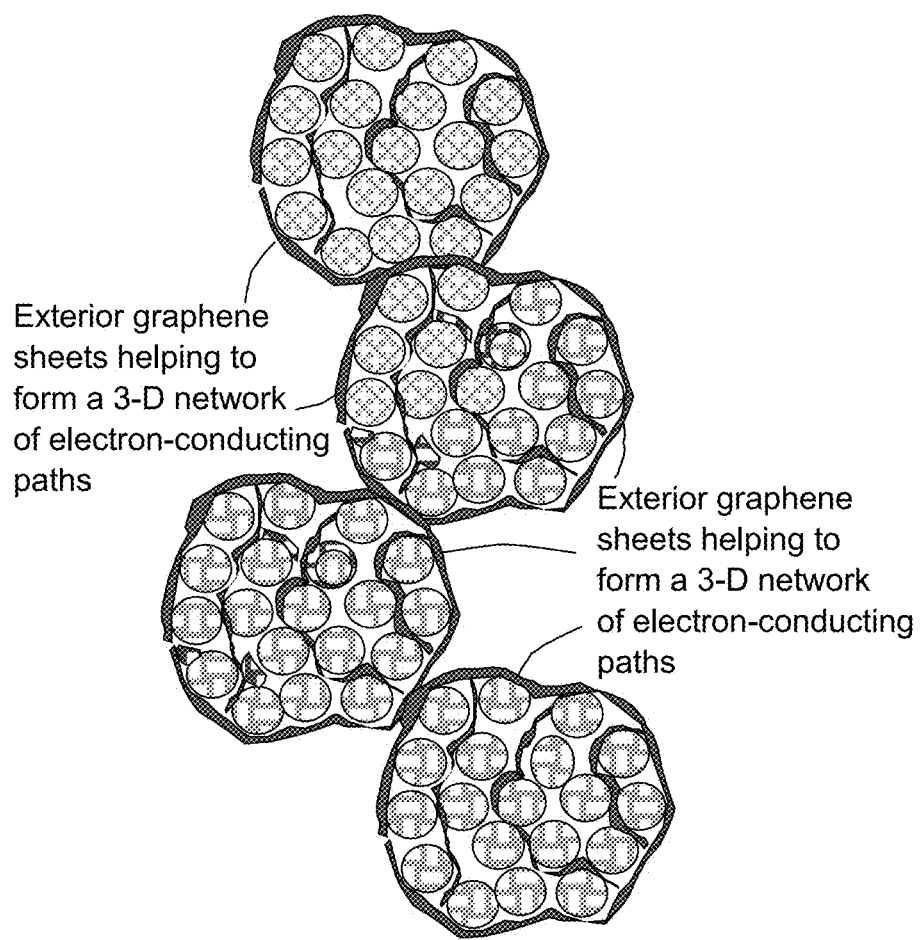
FIG. 7 A schematic illustrating that the graphene sheets disposed on the exterior surface of the particulates naturally form a 3-D network of electron-conducting paths when these hybrid particulates are packed together to form an electrode.

Not wishing to be limited by theory, but we feel that these surprising results on conductivity might be partially due to the high electrical conductivity of graphene and, more importantly, the two-dimensional geometric nature of graphene sheets. As illustrated in FIG. 7, the graphene sheets disposed on the exterior surface of the particulates naturally form a 3-D network of electron-conducting paths when these particulates are packed together to form an electrode. This geometry-enabled advantage could not be achieved with carbon nano-tubes (1-D nano particles) and carbon black (essentially 0-D nano particles).

Figure 8:
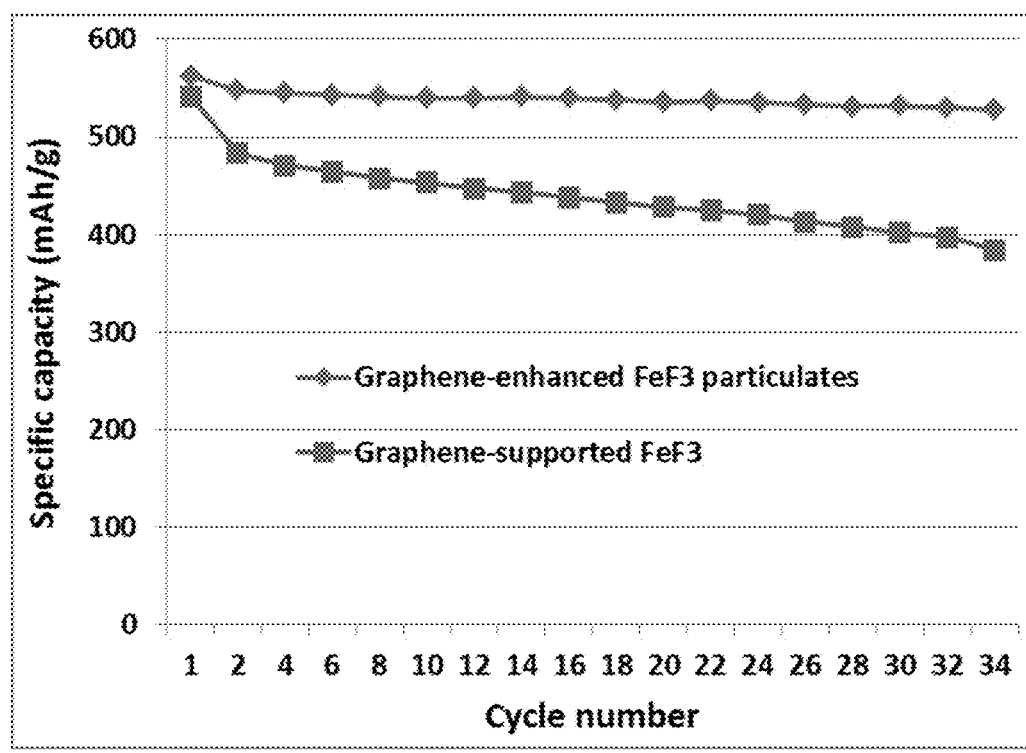
FIG. 8 The specific capacity of a cell containing a cathode of graphene-enhanced hybrid particulates of $FeF_3$ particles/graphene and that of a cell containing a cathode of graphene-supported $FeF_3$ nanocrystals, each plotted as a function of the number of charge/discharge cycles.
Figure 9:
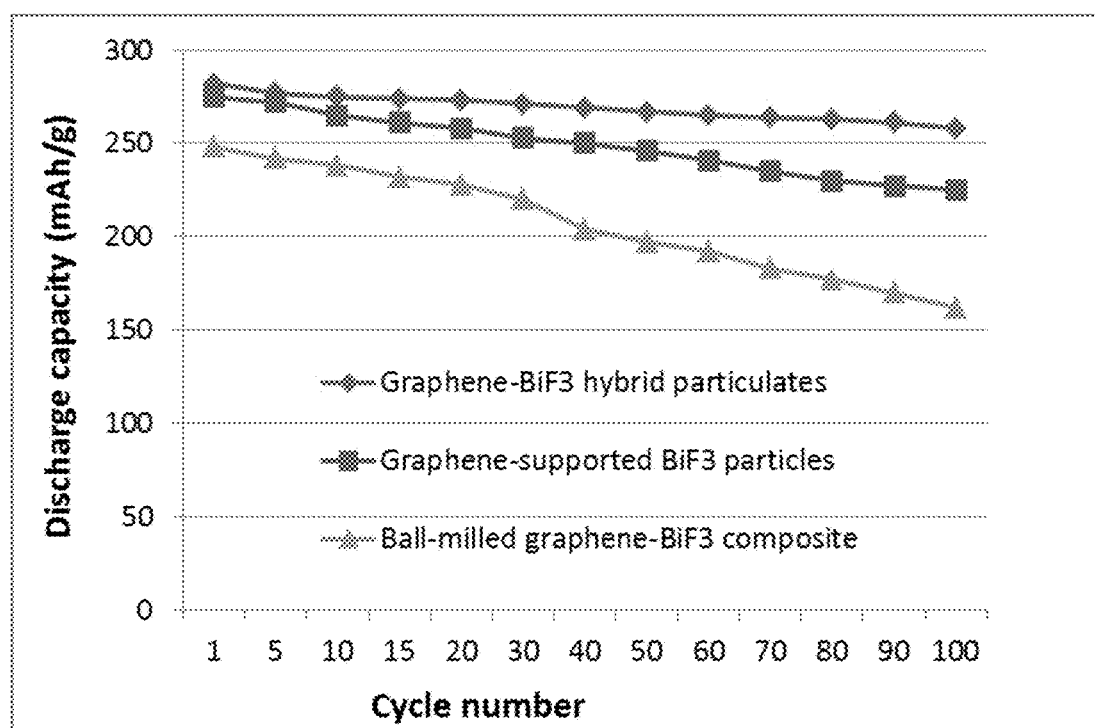
FIG. 9 The specific capacity of a cell containing a cathode of graphene-enhanced hybrid particulates of $BiF_3$ particles/graphene, the specific capacity of a cell containing a cathode of graphene-supported $BiF_3$ nanocrystals, and the specific capacity of a cell containing a cathode of ball-milled $BiF_3$/graphene mixture, each plotted as a function of the number of charge/discharge cycles.

More surprisingly and significantly, as illustrated in FIG. 8 and FIG. 9, the battery containing a cathode of graphene-enhanced hybrid particulates of $FeF_3$ particles/graphene exhibits a significantly more stable charge/discharge cycling behavior as compared to the battery cell containing a cathode of graphene-supported $FeF_3$ nanocrystals.

Most surprisingly and significantly, the cell containing a cathode of graphene-enhanced hybrid particulates of $FeF_3$ particles/graphene sheets delivers the highest energy densities and power densities. The presently invented composition and particulate structure helps to bring out the high lithium storage capacity of the transition metal fluoride at both high and low rate conditions. The high energy density (428 Wh/kg) and high power density (1,548 W/kg) are unprecedented for lithium secondary batteries, other than Li—S cells. The presently invented hybrid particulate approach enables a high active material utilization rate (i.e. minimized proportion of the active material not being fully utilized).

These unexpected, superior performance characteristics are not limited to $FeF_3$-based cathodes. Other metal fluoride- or metal chloride-based cathodes featuring graphene-encapsulated primary particles also deliver exceptional electrochemical performances. For instance, the cell containing a cathode of graphene-enhanced hybrid particulates of $BiF_3$ particles/graphene exhibits the best charge-discharge cycling stability as compared to the cell containing a cathode of graphene-supported $BiF_3$ nanocrystals and the cell containing a cathode of ball-milled $BiF_3$/graphene mixture. The differences are quite dramatic.

Figure 11:
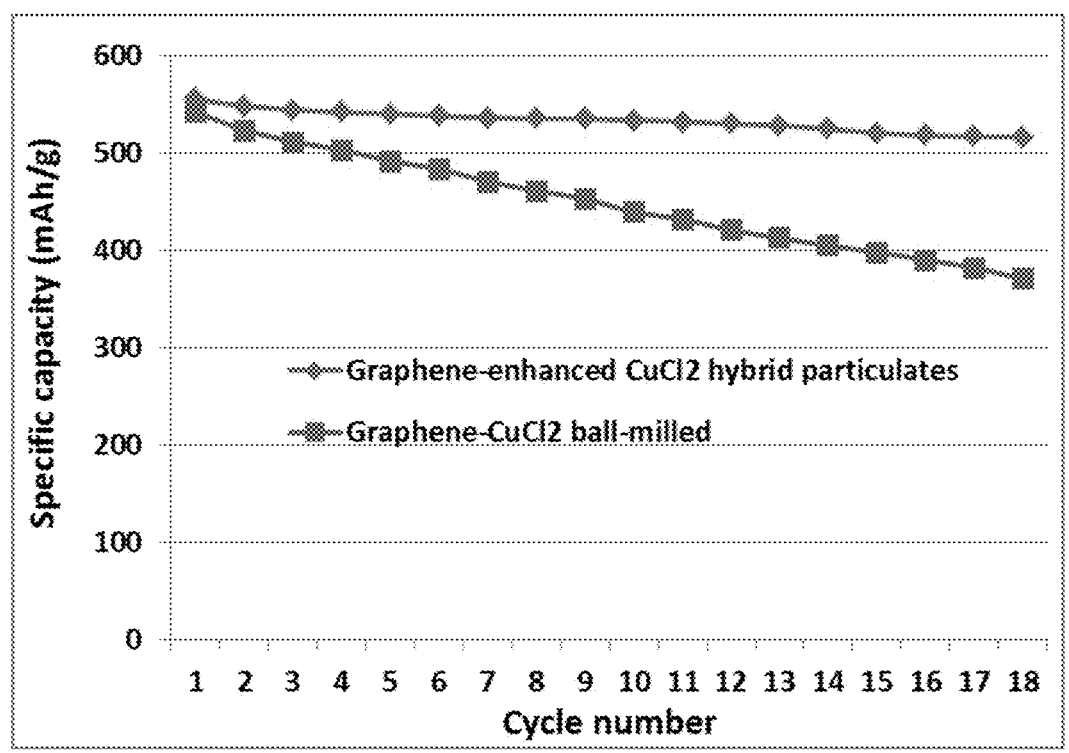
FIG. 11 The specific capacity of a cell containing a cathode of graphene-enhanced hybrid particulates of $CuCl_2$ particles/graphene and that of a cell containing a cathode of graphene-$CuCl_2$ mixture obtained by ball-milling, each plotted as a function of the number of charge/discharge cycles.

Similarly, FIG. 11 shows the specific capacity of a cell containing a cathode of graphene-enhanced hybrid particulates of $CuCl_2$ particles/graphene and that of a cell containing a cathode of graphene-$CuCl_2$ mixture obtained by ball-milling, each plotted as a function of the number of charge/discharge cycles. These data show the outstanding cycle stability afforded to by the presently invented hybrid particulate approach.

The invention claimed is:

1. A graphene-enabled hybrid particulate for use as a lithium battery cathode active material, wherein said hybrid particulate is formed of one or more graphene sheets and one or more fine cathode active material particles of a metal chloride and said one or more fine cathode active material particles have a largest dimension from 1 nm to 10 μm, and the one or more graphene sheets and the one or more fine cathode active material particles are mutually bonded or agglomerated into said hybrid particulate containing an exterior one or more of the one or more graphene sheets encapsulating the one or more fine cathode active material particles, and wherein said hybrid particulate has an electrical conductivity no less than $10^{-4}$ S/cm and a graphene sheet content is in an amount of from 0.01% to 30% by weight based on a total weight of the one or more graphene sheets and the one or more fine cathode active material particles, wherein said hybrid particulate further comprising a carbon material coated on at least one of the one or more fine cathode active material particles, wherein said carbon material is selected from the group consisting of polymeric carbon, amorphous carbon, chemical vapor deposition carbon, carbon black, acetylene black, activated carbon, fine expanded graphite particle with a dimension smaller than 100 nm, artificial graphite particle, natural graphite particle, and combinations thereof.

2. The hybrid particulate of claim 1 wherein said metal chloride is selected from the group consisting of $CuCl_2$, $FeCl_3$, $MnCl_2$, and combinations thereof.

3. The hybrid particulate of claim 1 wherein said hybrid particulate further contains an interior one or more of the one or more graphene sheets in physical contact with the one or more fine cathode active material particles and the exterior one or more of the one or more graphene sheets.

4. The hybrid particulate of claim 1 wherein the graphene sheet content is in an amount of from 0.1% to 10% by weight based on the total weight of the one or more graphene sheets and the one or more fine cathode active material particles.

5. The hybrid particulate of claim 1 wherein the electrical conductivity of said hybrid particulate is greater than $10^{-2}$ S/cm.

6. The hybrid particulate of claim 1 wherein said hybrid particulate is substantially spherical in shape.

7. The hybrid particulate of claim 1 wherein the one or more graphene sheets comprises single-layer graphene or few-layer graphene, wherein said few-layer graphene is defined as a graphene platelet formed of less than 10 graphene planes.

8. The hybrid particulate of claim 1 wherein the one or more graphene sheets is selected from the group consisting of pristine graphene, graphene oxide, reduced graphene oxide, graphene fluoride, graphene chloride, nitrogenated graphene, hydrogenated graphene, doped graphene, functionalized graphene, and combinations thereof.

9. The hybrid particulate of claim 1, wherein the one or more fine cathode active material particles in said hybrid particulate have the largest dimension smaller than 1 μm and greater than 1 nm.

10. The hybrid particulate of claim 1, wherein the one or more fine cathode active material particles in said hybrid particulate have the largest dimension smaller than 100 nm and greater than 1 nm.

11. The hybrid particulate of claim 1, wherein the one or more fine cathode active material particles in said hybrid particulate have the largest dimension smaller than 10 nm and greater than 1 nm.

12. The hybrid particulate of claim 1, wherein the one or more fine cathode active material particles in said hybrid particulate contain transition metal chloride particles in a nanowire, nanotube, nanodisc, nanoribbon, nanobelt, or nanoplatelet form have a diameter or thickness smaller than 100 nm.

13. The hybrid particulate of claim 1, wherein the one or more fine cathode active material particles in said hybrid particulate contain transition metal chloride particles in a nanowire, nanotube, nanodisc, nanoribbon, nanobelt, or nanoplatelet form have a diameter or thickness smaller than 10 nm and greater than 1 nm.

14. The hybrid particulate of claim 1, wherein the carbon material is in electronic contact with the one or more fine cathode active material particles and the one or more graphene sheets.

15. The hybrid particulate of claim 1, wherein said hybrid particulate is prepared from a process comprising:
(a) dispersing the one or more graphene sheets and the one or more fine cathode active material particles in a liquid medium to form a suspension; and
(b) drying said suspension using a procedure of spray-drying, spray-pyrolysis, fluidized-bed drying, ultrasonic spraying, aerosol spraying, freeze drying or liquid atomization to form said graphene-enabled hybrid particulate.

16. The hybrid particulate of claim 1, wherein said hybrid particulate is prepared from a process comprising:
(A) dispersing graphene sheets precursor and fine cathode active material particles precursor in a liquid medium to form a suspension;
(B) drying said suspension using a procedure of spray-drying, spray-pyrolysis, fluidized-bed drying, ultrasonic spraying, aerosol spraying, or liquid atomization to form a precursor particulate containing the graphene sheets precursor and said fine cathode active material particles precursor; and
(C) thermally or chemically converting said precursor particulate to form said graphene-enabled hybrid particulate.

17. The hybrid particulate of claim 16, wherein said step of converting comprises a procedure of chemically or thermally reducing said graphene sheets precursor to reduce or eliminate oxygen content and other non-carbon elements of said graphene sheets precursor.

18. A graphene-enabled hybrid material for use as a lithium battery cathode active material, wherein said hybrid material contains one or more graphene sheets and one or more fine cathode active material particles bonded to a surface of the one or more graphene sheets; wherein the one or more fine cathode active material particles have a largest dimension from 1 nm to 10 μm and contain a transition metal chloride selected from $CuCl_2$, $MnCl_2$, a combination thereof, or a combination thereof with $FeF_3$, and a graphene sheet content is in an amount of from 0.01% to 30% by weight based on the total weight of said hybrid material, wherein said hybrid particulate further comprising a carbon material coated on at least one of the one or more fine cathode active material particles, wherein said carbon material is selected from the group consisting of polymeric carbon, amorphous carbon, chemical vapor deposition carbon, carbon black, acetylene black, activated carbon, fine expanded graphite particle with a dimension smaller than 100 nm, artificial graphite particle, natural graphite particle, and combinations thereof.

19. The graphene-enabled hybrid material of claim 18, wherein the one or more fine cathode active material particles have the largest dimension from 1 nm to 100 nm.

20. The graphene-enabled hybrid material of claim 18, wherein the one or more fine cathode active material particles have the largest dimension from 1 nm to 10 nm.

21. A lithium battery cathode comprising multiple ones of said graphene-enhanced hybrid particulate of claim 1.

22. A lithium battery cathode comprising multiple ones of said graphene-enhanced hybrid particulate of claim 1, wherein said multiple hybrid particulates are packed together, forming a three-dimensional electron-conducting pathway.

23. A lithium battery comprising an anode, the cathode of claim 21, an electrolyte in physical contact with both the anode and the cathode, and a separator disposed between the anode and the cathode.

24. A lithium battery comprising an anode, the cathode of claim 22, an electrolyte in physical contact with both the anode and the cathode, and a separator disposed between the anode and the cathode.

25. A lithium battery cathode comprising multiple secondary particles of the graphene-enhanced hybrid material of claim 18.

26. A lithium battery comprising an anode, the cathode of claim 25, an electrolyte in physical contact with both the anode and the cathode, and a separator disposed between the anode and the cathode.

\* \* \* \* \*